(12) United States Patent
Shutic et al.

(10) Patent No.: US 6,866,717 B2
(45) Date of Patent: Mar. 15, 2005

(54) POWDER COATING SPRAY BOOTH WITH AIR CURTAIN

(75) Inventors: Jeffrey R. Shutic, Wakeman, OH (US); Larry Fenik, Avon Lake, OH (US); Scott Miller, Wakeman, OH (US); Brean Bark, Garfield Heights, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/145,934

(22) Filed: May 15, 2002

(65) Prior Publication Data

US 2003/0019425 A1 Jan. 30, 2003

Related U.S. Application Data

(63) Continuation-in-part of application No. 09/891,057, filed on Jun. 25, 2001, now Pat. No. 6,730,167.
(60) Provisional application No. 60/238,277, filed on Oct. 5, 2000, and provisional application No. 60/277,149, filed on Mar. 19, 2001.

(51) Int. Cl.[7] ........................... B05B 7/14; B05C 19/04; B05C 19/06; B05C 15/00; B05D 1/06
(52) U.S. Cl. ................ 118/309; 118/634; 454/50; 454/52; 454/58; 427/421.1
(58) Field of Search ..................... 118/309, 526, 118/634; 427/421.1, 424, 427; 454/50, 52, 58, 66

(56) References Cited

U.S. PATENT DOCUMENTS

| | | |
|---|---|---|
| 1,448,000 A | 3/1923 | Reeves |
| 3,029,776 A | 8/1962 | Proskauer |

(List continued on next page.)

FOREIGN PATENT DOCUMENTS

| | | |
|---|---|---|
| DE | 3538800 | 5/1987 |
| DE | G8812950 U | 1/1989 |
| DE | 19500873 A1 | 7/1996 |
| DE | 19616220 A1 | 10/1997 |
| DE | 19644360 A1 | 4/1998 |
| EP | 0402604 A2 | 5/1990 |
| EP | 0402604 A3 | 5/1990 |
| EP | 0678336 A2 | 3/1995 |
| EP | 0745430 A3 | 12/1996 |
| EP | 0745430 A2 | 12/1996 |
| EP | 0789628 B1 | 1/1999 |
| JP | 8 47661 | 2/1996 |
| JP | 8 47662 | 2/1996 |
| WO | WO 01/19529 A2 | 3/2001 |
| WO | WO 01/74497 A1 | 10/2001 |

Primary Examiner—Jeffrey A. Lorengo
(74) Attorney, Agent, or Firm—Calfee, Halter & Griswold LLP

(57) ABSTRACT

A powder spray booth includes a booth canopy wall arrangement to contain powder during a spraying operation; and a booth floor that is rotatable relative to the booth wall during a spraying operation. The floor can be rotated about an axis that is also the longitudinal axis of the spray booth. The booth may be generally cylindrical in shape with a round floor. The booth canopy and top are supported on a base frame separately from the floor. By this arrangement, the floor can be rotated relative to the booth canopy. A powder extraction apparatus in the form of a low pressure duct suspended off the floor draws up powder that has collected on the floor. The extraction duct is stationary with respect to the rotating floor during a spraying operation. The floor may also be translated along the axis of rotation between a first position in which the floor can rotate and a second position in which the floor is sealed against a lower edge of the booth canopy wall. The booth canopy and floor are made of composite materials that are very low in conductivity to minimize powder adhering to the floor and booth walls. The booth is thus easy to clean with a substantially shorter time period required for color change.

6 Claims, 29 Drawing Sheets

U.S. PATENT DOCUMENTS

| | | | |
|---|---|---|---|
| 3,270,711 A | * | 9/1966 | Leach ........................ 118/627 |
| 3,824,912 A | * | 7/1974 | Jensen et al. .................. 454/50 |
| 4,223,599 A | * | 9/1980 | Napadow ..................... 454/50 |
| 4,294,191 A | | 10/1981 | Loof |
| 4,301,764 A | * | 11/1981 | Campion et al. ........... 118/634 |
| 4,338,364 A | * | 7/1982 | Kennon et al. ............. 427/424 |
| 4,338,958 A | * | 7/1982 | Fujita ........................ 118/326 |
| 4,715,314 A | | 12/1987 | Ramseier et al. |
| 4,898,116 A | * | 2/1990 | Kozoe et al. ................ 118/621 |
| 4,924,803 A | | 5/1990 | Celant |
| 5,346,553 A | * | 9/1994 | Pingel ........................ 118/309 |
| 5,680,670 A | | 10/1997 | Adams et al. |
| 5,690,995 A | * | 11/1997 | Fischli et al. ............... 427/180 |
| 5,743,958 A | | 4/1998 | Shutic |
| 5,833,751 A | * | 11/1998 | Tucker ........................ 118/64 |

\* cited by examiner

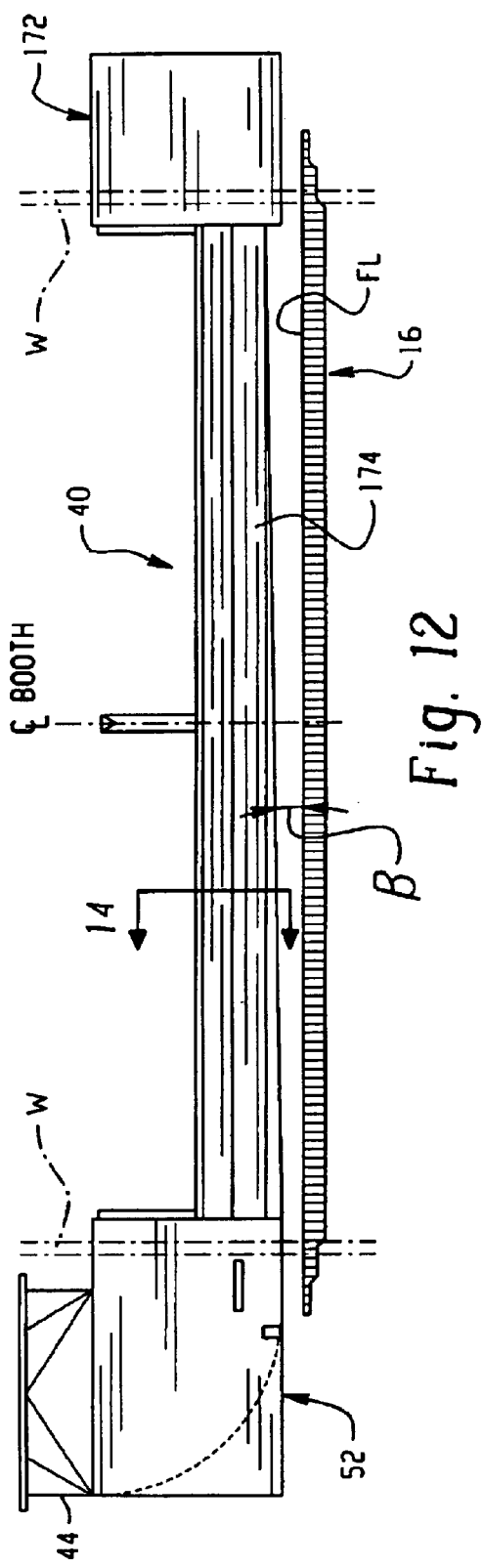
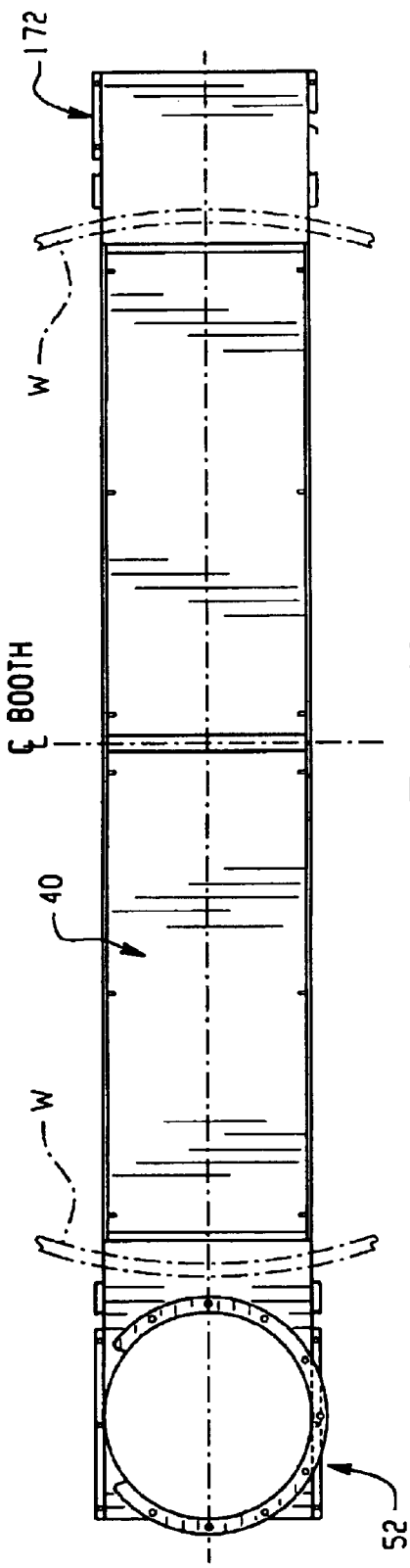
Fig. 12
Fig. 13

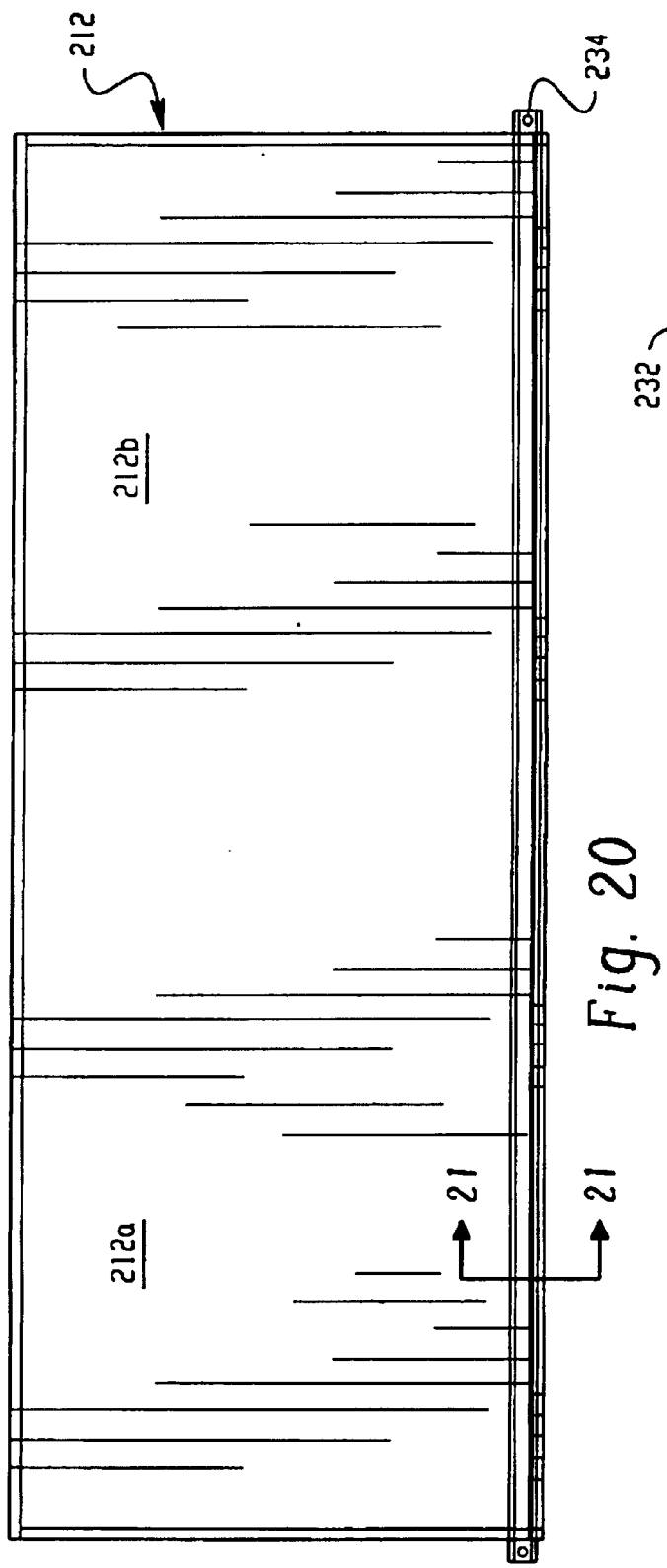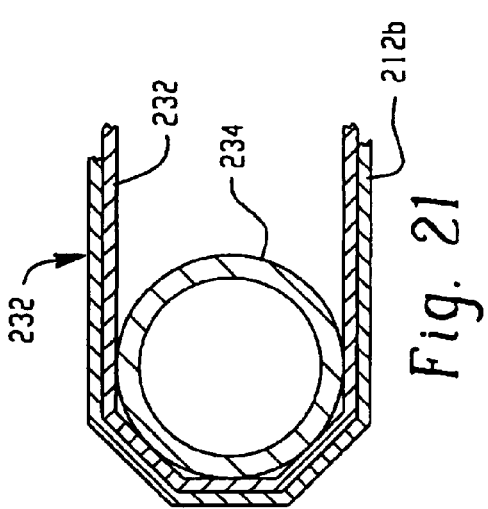

POWDER COATING SPRAY BOOTH WITH AIR CURTAIN

RELATED APPLICATIONS

This application is a continuation in part of U.S. patent application Ser. No. 09/891,057 filed on 25, Jun. 2001 for POWDER COATING BOOTH WITH A POWDER EXTRACTION SYSTEM, now U.S. Pat. No. 6,730,167 which claims the benefit of U.S. Provisional patent applications Ser. Nos. 60/238,277 filed on Oct. 5, 2000 for ROUND BOOTH WITH ROTATING FLOOR and 60/277,149 filed on Mar. 19, 2001 for QUICK CHANGE POWDER COATING SPRAY SYSTEM, the entire disclosures of which are all fully incorporated herein by reference.

FIELD OF THE INVENTION

The invention relates generally to powder coating spray systems which use powder containment spray booths. More particularly, the invention relates to a powder spray booth that facilitates cleaning and quick color change by the operation of a rotating floor and a powder overspray extraction duct, which results in very little powder remaining in the spray booth and minimizes the amount of powder in process during a spraying operation.

BACKGROUND OF THE INVENTION

Powder coatings are commonly applied to objects by powder spray guns that may be manually operated or automatic. In an automatic system, one or more spray guns are controlled to spray powder onto the objects as the objects are conveyed past the guns. In a manual gun operation, typically the object is suspended or otherwise positioned near a spray gun and the operator controls when the gun starts and stops spraying. A powder spray gun may be selected from a wide variety of gun designs. Since a spraying operation is intended to coat an object evenly, a common technique for spraying powder is to apply an electrostatic charge to the powder particles which causes the powder to better adhere to the object and also results in a more uniform application. Electrostatic spray guns include corona guns and tribocharging guns. In a corona type spray gun, a high voltage electrode is positioned in or near the powder flow path, either within the gun itself or just outside the gun near or at the gun nozzle. In a tribocharging type gun, the powder flow path through the gun body is made of suitable materials that impart an electrostatic charge to the powder as it is forced through the gun body.

The object being sprayed is electrically grounded such that the charged powder is attracted to and adheres to the object. This electrostatic attraction increases the transfer efficiency by increasing the amount of powder that adheres to the object. Transfer efficiency refers to the relationship between the amount of powder that adheres to the object being sprayed versus the amount of powder sprayed from the gun.

In most electrostatic spray systems, the powder is ejected from the gun nozzle as a cloud. This permits the powder spray to envelope the object to coat all the surfaces of the object, even when the object is irregular in geometric shape. Multiple guns may be positioned on different sides of the object and/or directed at different angles to increase the uniformity of the powder applied thereto. However, due to the inherent nature of the powder spray pattern, there is a substantial amount of powder that does not adhere to the object and ends up either falling to the floor or collecting on other objects and structures in the immediate area. This non-adherent powder residue is generally referred to as powder overspray.

Because powder overspray is generated during each spraying operation, spraying operations typically are performed within a spray booth. The spray booth is used for powder containment and may only be partially enclosed. Most spray booths have an air flow system that contains the powder overspray within the structure of the booth by producing a negative pressure zone that draws air from the powder booth along with powder overspray that is entrained in the air flow. The powder laden air is then transferred to a cartridge filter system or cyclone separator system outside the spray booth to recover the powder. However, in known spray booth systems, the powder overspray still tends to collect on the booth walls, ceiling and the booth floor. In electrostatic systems especially, the powder overspray will also tend to be attracted to and collect on any structure that is electrically grounded. The powder particles tend to be very small and well dispersed and therefore can collect in the smallest of recesses, seams and crevices and irregular spray booth wall structures.

Powder overspray presents a two-fold challenge. First, if possible it is usually desirable to try to reclaim or recover powder overspray so that the powder can be reused during subsequent spraying operations. Known powder recovery systems typically work on the basis of a large air volume that entrains the powder overspray. These air flow volumes are routinely generated by conventional high volume exhaust fans. The powder laden air is then filtered, such as for example using cartridge type air filters or cyclone separators. The separated powder is then sieved to remove impurities and returned to a hopper or powder feed center where it is supplied once again to the spray guns. In known systems the actual reintroduction of recovered powder to the powder spray application system is usually accomplished by a positive air pressure conveyance system back to a powder feed center through a series of hoses, valves and pumps.

Besides the challenge of recovering powder overspray for subsequent use or disposal, powder overspray that collects within the spray booth must be removed from the booth when changing over the powder coating color. In order to switch from one color to another the guns, booth and powder recovery system must be as completely purged of the previous colored powder as possible to prevent contamination of the subsequent colored powder. The operation of changing from one color to another is generally known as a "color change" operation and it is an ongoing challenge in the art to make spraying systems that are "quick color change" meaning that the goal is to keep reducing the down time when the spraying system is off line in order to clean the spraying apparatus and system. Thus, the amount of in-process powder, as well as the amount of powder overspray that remains in the spray booth, have a significant impact on the amount of time and effort it takes to perform a color change operation.

A powder coating booth and application system must be completely cleaned and purged of one color of powder coating material prior to a successive coating operation using a different powder color. Cleaning a powder coating spray booth can be a labor-intensive effort. Powder coating materials, in varying degrees, tend to coat all the internal surfaces of the spray booth during a powder coating spray operation, which directly impacts color change time. In a production powder coating environment, minimizing the system down time to change from one color of powder coating material to another is a critical element in controlling operational costs. Seams between booth panels and recessed ledges, such as where access doors or automatic or manual spray application devices may be located, are typically hard to clean areas and tend to hold concentrations of oversprayed powder coating material that could present a contamination risk after a color change. In addition to seams and ledges and other recesses within the booth, charged powder can adhere to booth interior surfaces.

In typical powder coating booth construction, an outer steel framework is provided for supporting individual panel members which form the roof, side and end walls of the booth. These panel members are known to be made of a fabricated or thermoformed plastic, such as polypropylene, polyvinyl chloride (PVC), polyvinyl carbonate or polycarbonate. The floor may also be of thermoformed plastic or stainless steel construction. In other known embodiments, powder coating spray booths can have metallic walls, ceilings and vestibule ends, as well a metallic floor and exterior support framework.

U.S. Pat. No. 5,833,751 to Tucker is an example of a powder coating spray booth intended to reduce powder particle adhesion to the interior surfaces of the, booth during an electrostatic powder spray operation. Tucker discloses a booth chamber comprising a pair of thermoformed plastic shells with smooth curvilinear interior surfaces that are intended to inhibit oversprayed powder particle adhesion. Two identical ends connect with the shells and an external support frame is disclosed, but not shown. Possible booth materials disclosed include polycarbonate.

Known booth materials are available in limited sizes requiring some method of seaming to generate the overall size. These seams require much effort and cost to achieve a virtually uninterrupted, seamless surface.

In addition, known powder coating spray booths have numerous features that reduce operational efficiencies. These sub-optimal features are evidenced during powder coating color changes between successive runs of different coating colors and during assembly and maintenance of the booth itself. Known powder coating spray booths use metallic external support frames and stainless steel or thermoplastic, floors, walls and ceilings. During an electrostatic powder spray coating operation, oversprayed powder material can actually be attracted and adhere to these booth interior surfaces. Higher concentrations of oversprayed powder coating material are typically seen in the immediate vicinity of the highly conductive steel frame members, which are typically grounded. Although thermoformed plastics are typically thought of as insulators, their insulation properties vary and powder particle adhesion can vary with the conductance and resistance of these materials. With age, physical properties of the thermoformed plastic materials can change with corresponding increases in powder particle adhesion, as they can absorb moisture from the ambient air over time. Ultraviolet light is also known to change the physical properties of thermoplastics over time.

In addition, typical booths have numerous design features that act to increase accumulated oversprayed powder coating materials in the spray booth, thus increasing cleaning times during color change operations. In booths using panel members connected with each other and supported by an external frame, numerous seams exist throughout the booth interior that entrap oversprayed powder coating material, thereby making the booth harder to clean during a color change or routine booth maintenance. In addition to the seams, ledges are present in some powder coating spray booths on which spray gun application devices rest and are mounted, and where openings for doors and other access portals are reinforced and secured, for example. These ledges can either extend into the booth or, more typically, extend away from the inner surface of the booth. Even if otherwise angled or curved toward the floor from the typically vertical side walls, oversprayed powder coating material still tends to accumulate in these areas, thus making them more difficult to clean, as well.

Known prior systems for removing powder overspray from a spray booth include active systems in which floor sweepers and other mechanical devices are used to mechanically contact the powder and push it off the floor into a receiving device. These systems however tend to be cumbersome and are not thorough in the amount of powder removed from the booth. A substantial effort by one or more operators is still required to completely remove powder from the booth. Thus there can be a large amount of in-process powder and powder overspray on the booth structure.

In passive removal systems, powder is removed from the floor in a non-contact manner. In one known system, a rectangular floor in the form of a continuous linearly moving belt transports powder over to a collection device such as a vacuum system that removes powder from the belt. Such systems are very complicated mechanically and do not do an adequate job in removing powder from the belt, so much so that in some cases a color change requires a change of the belt itself.

It is desired therefore to provide a spray booth that is easy to clean as part of a color change operation and operates so as to minimize the amount of in-process powder and the amount of powder overspray remaining in the spray booth after a spraying operation is completed.

SUMMARY OF THE PRESENT INVENTION

The present invention is directed to improved spray booth designs that are particularly suited for electrostatic spraying operations, although the various aspects of the invention may be incorporated into spray booths that do not utilize electrostatic spraying apparatus. According to one aspect of the invention, a powder extraction system is contemplated in which powder overspray can be continuously extracted from the booth even during a spraying operation. In one embodiment of the invention, a powder spray booth includes a booth canopy wall and ceiling arrangement to contain powder during a spraying operation; and a booth floor that is rotatable relative to the booth wall during a spraying operation. The booth may be generally cylindrical in shape with a round floor. The floor can be rotated about a vertical axis that is also the longitudinal axis of the spray booth. The booth canopy and ceiling are supported on a base frame separately from the floor. By this arrangement, the floor can be rotated relative to the booth canopy. By continuously removing powder overspray in a real-time manner during a powder spraying operation, the amount of in-process powder is substantially reduced and the time and effort required to clean the booth as part of a color changeover is dramatically and significantly reduced.

In accordance with another aspect of the invention, a powder extraction mechanism is provided for removing powder overspray from the booth floor. In one embodiment, the extraction mechanism is a duct that extends across the booth floor and supported just off the floor. A negative pressure source is connected to the duct to cause a suction effect by which powder overspray is removed from the floor and transported via the extraction duct to a collection device that is disposed outside the booth. In a preferred form, the extraction mechanism is stationary with respect to the rotating floor and extends diametrically across the floor.

In accordance with another aspect of the invention, the booth floor can be translated as well as rotated. In one embodiment, the booth floor can be axially translated along the axis of rotation. The floor can be moved to a first axial position in which the floor is free to rotate during a spraying operation, and a second axial position where the floor sealingly contacts the bottom of the booth canopy or wall during a color change operation. A source of pressurized air is positioned to blow powder from the seal as part of a color change operation.

Still a further aspect of the invention concerns a mechanism for effecting the axial translation of the floor. In one embodiment the floor is moved by a floor lifter mechanism that moves the floor between the first and second axial positions. In one embodiment the lifter mechanism is a pneumatic actuator that acts on a rocker arm to raise and lower the booth floor.

In accordance with another aspect of the invention, a cyclone system is used to separate the powder overspray from the air drawn in by the extraction duct. A fan is connected to the cyclone system which in turn is connected to the extraction duct. The air flow that is pulled through the duct creates a negative air pressure flow that draws up powder that has collected on the booth floor into the extraction duct and also provides containment air flow within the booth canopy. In one embodiment, the cyclone system is provided with a by-pass valve for selecting between powder overspray reclaim and non-reclaim operating modes.

Still a further aspect of the invention relates to the use of composite materials for the spray booth and floor that are very low in conductivity to minimize powder adhering to the booth and floor, while possessing significant structural properties that enable the configuration to be mechanically sound. In one embodiment, the booth canopy is made of two composite half cylinders that are entirely self-supporting so that the canopy and ceiling can be suspended over an underlying rotatable floor. In this embodiment the floor is also made of very low conductivity composite materials with sufficient structural strength to permit a floor design whereby the floor can be rotated on a central hub.

In accordance with another aspect of the invention, powder overspray containment is augmented by eliminating powder escaping through the conveyor slot. In one embodiment, an air curtain is realized in the form of a pair of passageways having air jets formed therein that direct a flow of air into the booth proximate the conveyor slot. In another embodiment, the passageways are used to direct an air stream across a spray booth floor.

A still further aspect of the invention relates to reducing the cost and improving the cleanability of the extraction duct by eliminating a portion of the duct. In one embodiment, a half-duct configuration is utilized in which an extraction duct extends about halfway across the spray booth floor. This also increases the ease of movement within the booth for an operator during a color change or cleaning operation.

In accordance with another aspect of the invention, surface charge on the outside surfaces of the extraction duct are substantially eliminated by disassociating the powder particles from electrostatic charge applied to the powder particles during a spraying operation. In one embodiment, an extraction duct is formed using a non-conductive outer layer and a conductive inner layer.

These and other aspects and advantages of the invention will be readily appreciated and understood by those skilled in the art from the following detailed description of exemplary embodiments of the invention with reference to the accompanying drawings.

BRIEF DESCRIPTION OF THE FIGURES

FIGS. 12 and 12A is an extraction duct shown in elevation and perspective respectively;

FIG. 13 is the extraction duct of FIG. 12 shown in plan;

FIG. 20 illustrates an embodiment of the valve element of FIG. 19 in front elevation;

FIG. 21 is a cross-section of the valve element of FIG. 20 taken along the line 21—21;

DETAILED DESCRIPTION OF THE INVENTION

Figure 1:
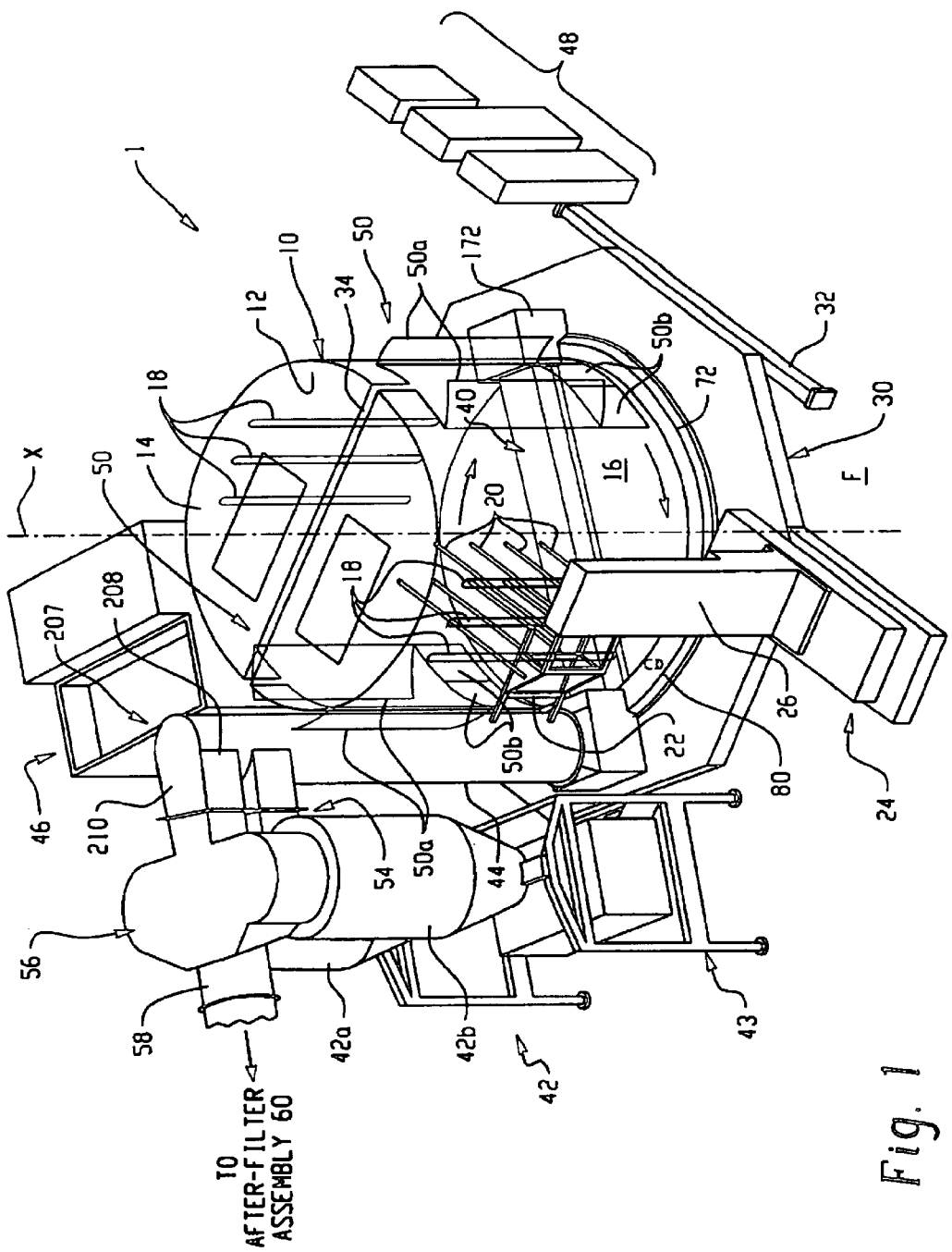
FIGS. 1 and 1A are isometric schematic representations of a powder spraying system in accordance with the invention, with FIG. 1A illustrating a manual spray booth or vestibule attached to the main spray booth.
Figure 1A:
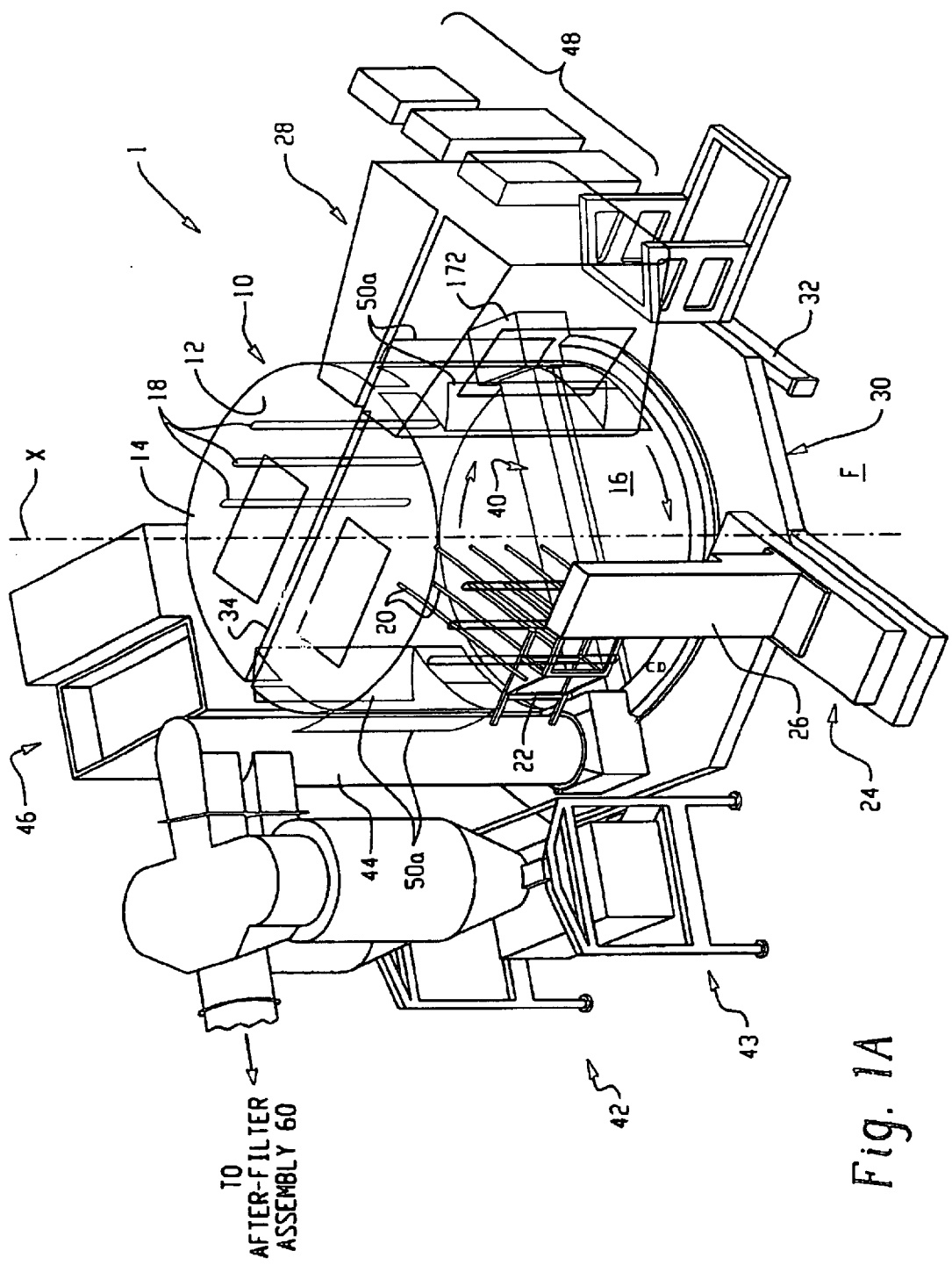

With reference to FIGS. 1 and 1A, the present invention is directed to a powder spraying system, as well as specific components within such a system, to improve the cleanability and reduce the time to effect color change operations, while at the same time minimizing impact on transfer efficiency while maximizing impact on containment and recovery of the powder overspray. Various aspects of the invention are described herein in an exemplary manner, and as part of an overall spraying system, but such descriptions are not to be construed in a limiting sense. The various aspects of the invention may be used individually or in any various combinations as required for a particular application. Furthermore, although the present invention is described with respect to the use of electrostatic spray technology, the invention is not limited to the use of electrostatic spraying apparatus.

FIG. 1 illustrates a powder coating spraying system 1 with several of the main components illustrated in a schematic fashion for ease of illustration. Such components are generally referenced with letters rather than numbers, and are well known and need not be described in detail. Accordingly, the present invention is described in detail as to those elements that relate to the various aspects of the invention.

The system 1 generally includes a spray booth 10. Note in FIG. 1 that the spray booth 10 is represented in a "transparent" manner so that the basic arrangement of components within the booth 10 can be illustrated. In actual practice the booth 10 is made of non-conductive composite materials that are not necessarily transparent, although there is no specific limitation on the choice of materials used for the booth 10. In a preferred but not necessarily required embodiment of the spray booth 10, the booth is constructed from of materials that are very low in conductivity and are composite in nature. These materials render the booth 10 substantially self-supporting and seamless. A suitable manufacturing process and structure for the booth 10 out of such composite materials is fully described in co-pending U.S. patent application Ser. No. 09/550,353 filed on Apr. 14, 2000 for POWDER COATING BOOTH CONTAINMENT STRUCTURE, and also described in co-pending PCT Application No. PCT/US 01/40524 filed on Apr. 14, 2001, and published on Oct. 25, 2001, for POWDER COATING BOOTH CONTAINMENT STRUCTURE, which applications are owned in common by the assignee of the present invention, the entire disclosures of which are fully incorporated herein by reference. Although these structure and materials for the booth 10 are preferred for electrostatic applications, the present invention is not limited to the use of a booth with such structural and materials characteristics, particularly in systems that will not utilize electrostatic spraying devices.

In the illustrated embodiment, the booth 10 is generally cylindrical in shape, including a vertically extending canopy or wall structure 12, a ceiling, cover or top 14 and a floor 16. In this example, the canopy 12 is realized in the form of two generally hemispherical halves that are joined together by mating flanges (not shown). The halves can be joined by non-conductive fasteners or adhesive so that the basic cylindrical shell is non-conductive. It is preferred although not necessary that the ceiling 14 and the floor 16 also be seamless and made from the same non-conductive composite materials as the canopy. The above-cited patent application discloses a composite booth structure with sufficient strength to permit humans to walk on the floor 16. The canopy 12 is also self-supporting such that no exterior frame is needed to support the booth 10. The canopy 12 and the ceiling 14 may be integrally formed if so desired.

Although the booth 10 is generally cylindrical in shape, it is not a fully enclosed structure. Access doors and other openings are provided to facilitate a spraying operation. For example, a plurality of gun slots 18 are provided on opposite sides of the booth 10 to permit a corresponding plurality of spray guns 20 to extend into and be withdrawn from the spray booth 10. The guns 20 may be of any suitable design, including a gun design as disclosed in co-pending U.S. patent application Ser. No. 09/667,663 filed on Sep. 22, 2000 for POWDER SPRAY GUN, the entire disclosure of which is fully incorporated herein by reference.

For clarity and ease of illustration, the spray guns 20 are only illustrated on one side of the booth 10 in FIGS. 1 and 1A, it being understood that second set of spray guns and a gun mover may be used on the opposite of the booth 10. The particular system 1 illustrated in FIG. 1 is an automatic system in which the spray guns 20 are mounted on a suitable support frame 22 that is installed on a gun mover 24. The gun mover 24 and the frame 22 are illustrated schematically since any of a number of gun mover and support designs may be used. In this example, the gun mover 24 includes an oscillator 26 that can raise and lower the spray guns 20 along the gun slots 18.

The spray booth 10 however may also be used for manual spraying operations, and therefore may be equipped with an optional vestibule assembly 28 (FIG. 1A only). Preferably the vestibule 28 is made of the same composite materials and structure as the canopy 12.

Continuing with the general description of the system 1, the booth 10 is supported off the shop floor F by a support frame or base 30. The base 30 is supported on the floor F by a pair of parallel rigid bars 32 (only one shown in FIG. 1) which are described in greater detail hereinafter. In accordance with one aspect of the invention, the booth 10 is fully supported on the frame 30 just off the shop floor F such that the entire booth/frame 10/30 assembly can be installed as a retrofit for a preexisting spray booth without the need to modify elevation of the shop floor F or the part conveyor height. Thus there is no need to trench or lower the floor F to accommodate any portion of the spray booth 10 or frame 30. In the illustrated embodiment herein, for example, the booth floor 16 is installed a mere 12 inches or so above the shop floor F. This permits simple ductwork to be used to interconnect the various conventional components of the spraying system 1.

The upper portion of the canopy 12 and the ceiling 14 are provided with a conveyor slot 34 that extends diametrically across the entire booth 10. Objects that are to be sprayed are suspended (not shown) from the conveyor C (FIG. 2) in a conventional manner so that the objects can be passed into and through the booth 10 past the spray guns 20.

An extraction duct 40 is installed in the booth 10 in close proximity to the floor 16. This extraction duct 40 has a discharge end is in fluid communication with a dual or twin cyclone separator system 42. In accordance with one aspect of the invention, a substantial negative pressure is produced in the extraction duct 40 via air drawn by operation of the cyclone system 42 and an after-filter system assembly 60 (FIG. 4). A large blower in the after-filter system 60 produces a substantial air flow from the booth 10 interior into the extraction duct 40 in the nature of a vacuuming effect such that powder overspray on the floor 16 is drawn up into the duct 40 and entrained in the air flow therein. This powder laden air is drawn into the cyclone system 42 via appropriate ductwork 44 that connects through an opening in the canopy 12 to the discharge end of the extraction duct 40. The opposite end of the extraction duct 40 terminates at an access door duct (172). The cyclone system 42 exhaust air passes to the secondary after-filter system (60) or collection system (not shown in FIG. 1) for removal of fines. A dual cyclone arrangement 42a,b is preferably but not necessarily used in order to provide a substantial air flow through the extraction duct 40 to remove powder overspray from the floor 12.

In general, the present invention is described herein with reference to an embodiment in which powder overspray is removed from the booth 10 and fed to a powder collection system. In the described embodiments, the powder collection system includes either a powder reclaim system through operation of a cyclone system and apparatus for conveying powder from the cyclone back to the feed center. Alternatively, in the present application we describe a powder collection system in which the powder is not reclaimed but rather is diverted past the cyclone system directly to an after-filter or other arrangement for the powder to be disposed. The present invention therefore does not depend on the particular powder collection system used outside but rather is directed to extracting powder overspray from within the spray booth, and the term "powder collection" should be construed in its broadest sense to encompass any post-spraying disposition of the powder overspray outside the booth, whether the powder overspray is reclaimed or not.

In FIG. 1 the cyclone system 42 is illustrated as being supported on the shop floor F by a cyclone support frame 43. Alternatively, the cyclone system 42 may be supported directly on the booth support frame 30.

The air flow that is drawn through the extraction duct 40 also provides a containment air flow within the booth 10 interior. Substantial volume of air is drawn into the booth 10 via various openings and access doors provided in the canopy 12.

The extraction duct 40 is supported at each end by the base 30, not the booth floor 16. The canopy 12 and installed ceiling 14 are also supported by the base 30 and not the booth floor 16. In accordance with another aspect of the invention, the booth floor 16 is rotatable about the central longitudinal axis X of the booth 10. The extraction duct 40 in this case is stationary relative to the rotating floor 16 so as to provide a sweeping action between the extraction duct 40 and the floor 16 surface. In this manner, the floor is cleaned of powder overspray as it collects on the floor even during a spraying operation. Of particular note is that the overspray may be extracted during or after a spraying operation.

Completing the general description of the system 1, the cyclone system 42 may be conventional in design and separates the entrained powder from the drawn air. The system 1 also includes a powder feed center 46 that supplies powder to the spray guns 20 through an appropriate system of a feed hopper, feed hoses and powder pumps, as is well known to those skilled in the art. A control console or system 48 is also provided that controls the operation of the guns 20, the cyclone system 42, the gun movers 26, the conveyor C, floor 16 rotation and position, and the feed center 48. The control system 48 may be conventional in design. Suitable control systems are described in U.S. Pat. Nos. 5,454,256 and 5,718,767; a suitable cyclone system is disclosed in U.S. Pat. No. 5,788,728; and a suitable feed center is disclosed in U.S. provisional patent application Ser. No. 60/154,624 which corresponds to copending PCT application Ser. No. 00/25383 filed on Sep. 15, 2000 and published on Mar. 22, 2001 (WO 01/19259 A2) for QUICK COLOR CHANGE POWDER COATING SYSTEM, the entire disclosures all of which are fully incorporated herein by reference. Powder that is separated by the cyclone system 42 may be returned to the feed center 46 for reuse (not shown in FIG. 1).

In accordance with another aspect of the invention, the floor 16 not only can rotate, but also can be axially translated along the axis of rotation X. This permits the floor 16 to have at least two axial positions, the first being a lowered position in which the floor 16 is free to rotate during a spray coating operation, and a second position in which the floor 16 is raised and is sealed against the lower edge of the canopy 12 walls during a color change operation. By moving the floor 16 into the sealed or raised position, an operator can use an air wand or other suitable device to blow down powder overspray that may have collected on the canopy 12, the ceiling 14 or the outside of the extraction duct 40, into the extraction duct 40. For example, the extraction duct 40 is preferably at least partly made of metal to act as an ion collector for electrostatic spraying systems. Consequently, powder will adhere and collect on the outer surface of the extraction duct 40, but this small amount of powder can quickly and easily be blown off and will be quickly swept up into the duct 40. The blower assembly 60 preferably remains on at all times during spraying and cleaning/color change operations.

In its raised position, the floor 16 is fully supported (as will be described herein) so that one or more operators may walk across the floor as required for air cleaning the booth 10, usually as part of a color change operation. The floor 16 is then lowered and rotated while operating the cyclone system 42, thereby removing the last remaining quantities of overspray. Color change therefore is a very fast and simple procedure in terms of cleaning out the spray booth 10. The preferred use of the composite materials for the booth 10 substantially eliminates powder collecting on the canopy 12 and ceiling 14, and permits the extraction duct 40 to easily and efficiently remove powder from the floor 16. The floor 16 is non-conductive except at the drive hub assembly (not shown in FIG. 1), but the drive hub assembly is located within the extraction duct 40 such that powder cannot collect at the hub due to the high air flow through the duct 40.

The outside surfaces of the housings or bodies of the guns 20 may be cleaned by air jets 21 (FIG. 4) that are positioned at the gun slots 18. As illustrated in the enlarged portion of FIG. 4, the air jets 21 (one for each gun body) are installed on a common air tube 21a that extends vertically along the length of its associated gun slot 18. In this embodiment there is an air tube/jet arrangement for each gun slot 18. The air jets 21 blow high pressure air across each gun body as the guns 20 are withdrawn from the booth 10 by the gun movers 24, thereby cleaning powder from the guns 20 and blowing powder off the gun bodies into the booth 10 where it is extracted via the extraction duct 40.

A significant aspect of the system 10 is that it can be realized as part of a retrofit on an existing system without the need for major changes to the shop area. For example, in the illustrated embodiment, the booth floor 16 is a mere 12 inches above the shop floor F. This permits the booth 10 to be interconnected if required with preexisting cyclone and feed systems, as well as fitting under existing conveyor systems.

Figure 2:
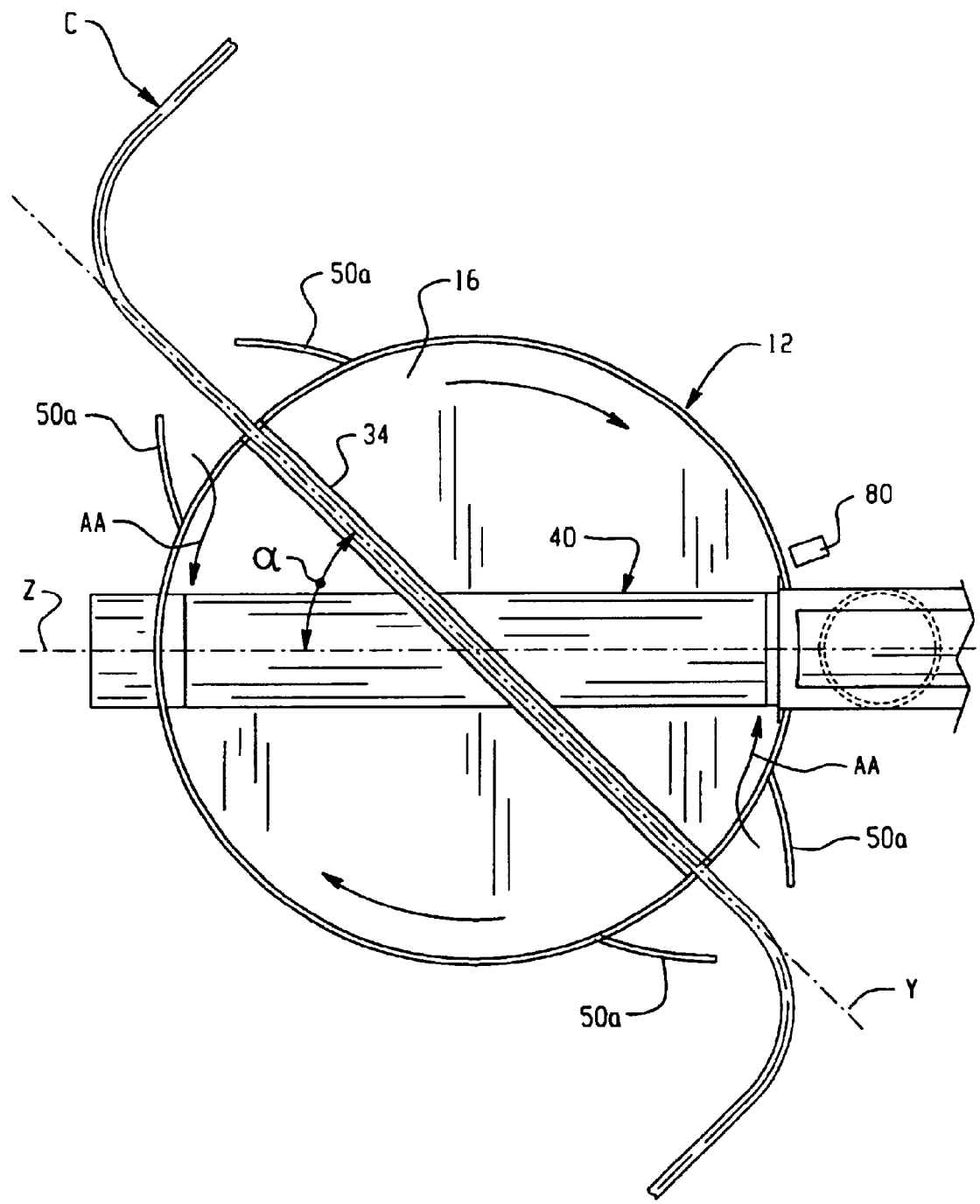
FIG. 2 is a simplified top view of the spray booth and cyclone system.

With reference to FIG. 2, the spray booth 10 is illustrated in a simplified manner from a top or plan view with the base 30 and the ceiling 14 omitted. The canopy 12 includes access doors 50 that permit larger objects to be conveyed into the spray booth 10. As illustrated in FIG. 1, the doors 50 may be similar to a "dutch" door arrangement in which there are upper doors 50a and lower doors 50b. The lower doors 50b are typically opened simply to permit an operator easy access to the booth 10 interior. These openings provide the major source of air that enters the booth 10 during a spraying operation when the cyclone system 42 is operating. This primary air flow pattern serves as containment air to keep the powder overspray within the booth 10. Although air flow will also be produced in other areas of the booth 10, for example at the conveyor slot 34, these secondary openings and gaps contribute much less to the overall containment air pattern than the air entering through the various door openings and any vestibule when vestibules are used. The diametric centerline Y of the primary air flow pattern, such as for example through the access doors 50, forms an angle α with the centerline Z of the extraction duct 40. Preferably the angle α is about 45 degrees. Thus the air flow (as indicated by directional arrows AA) into the booth 10 is not parallel with the extraction air flow into the duct 40. This causes air flowing into the booth 10 to have to turn and head downward (see also FIG. 4) in order to reach the low pressure zone near the extraction duct 40 along the floor 16, as represented by the directional arrow AA. This air flow pattern thus produces a descending outer air circulation around the booth 10 that results in a relatively low air flow in the central region of the spray booth 10, which central region is where the spray guns 20 are disposed to spray an object. This relatively calm central region means that the powder spray patterns are not adversely affected by the rather high volume of containment air flowing into the booth 10. Thus, excellent powder containment is effected without a significant effect on the transfer efficiency of the guns 20.

Figure 3:
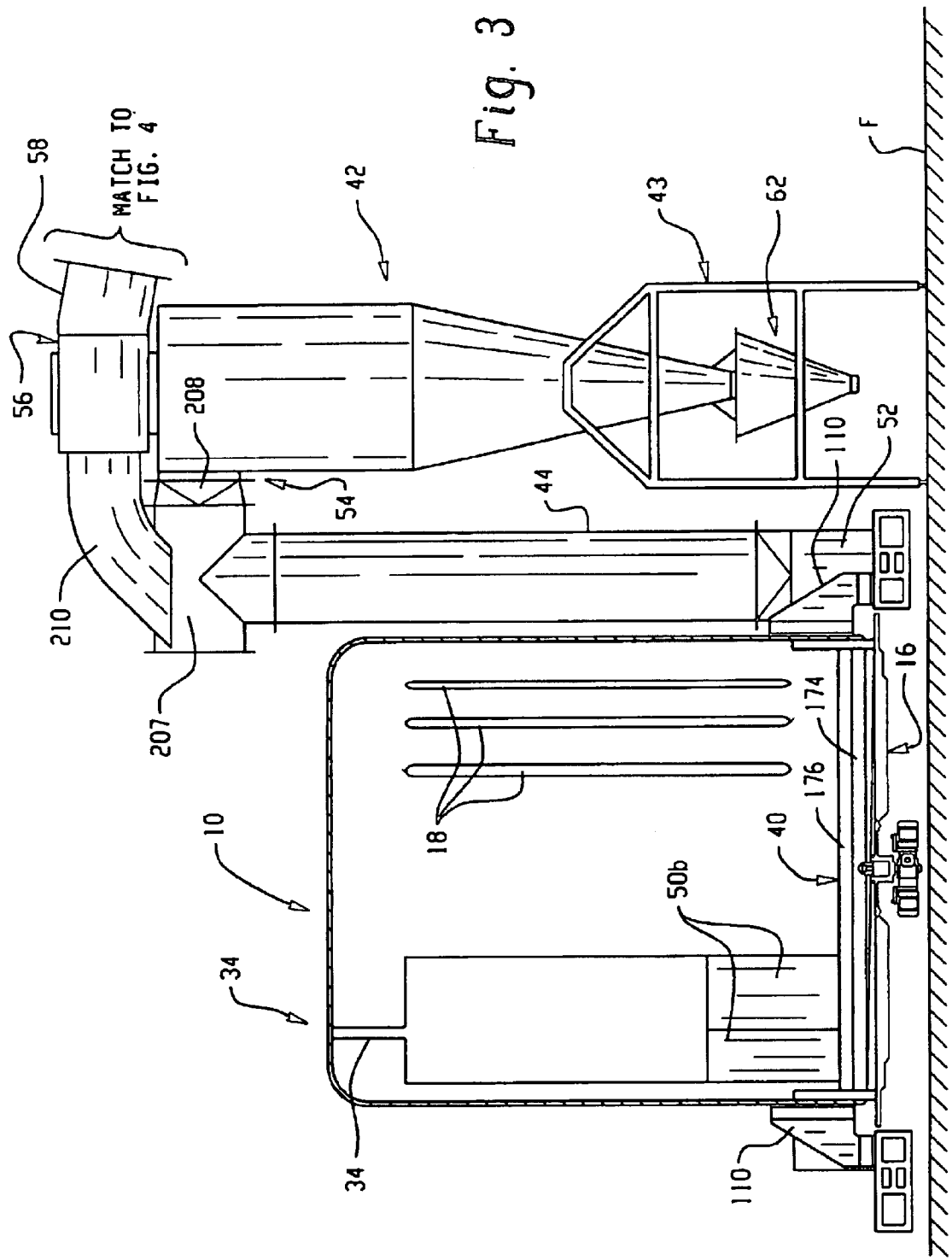
FIGS. 3 and 4 illustrate in elevation a typical powder coating system layout.
Figure 4:
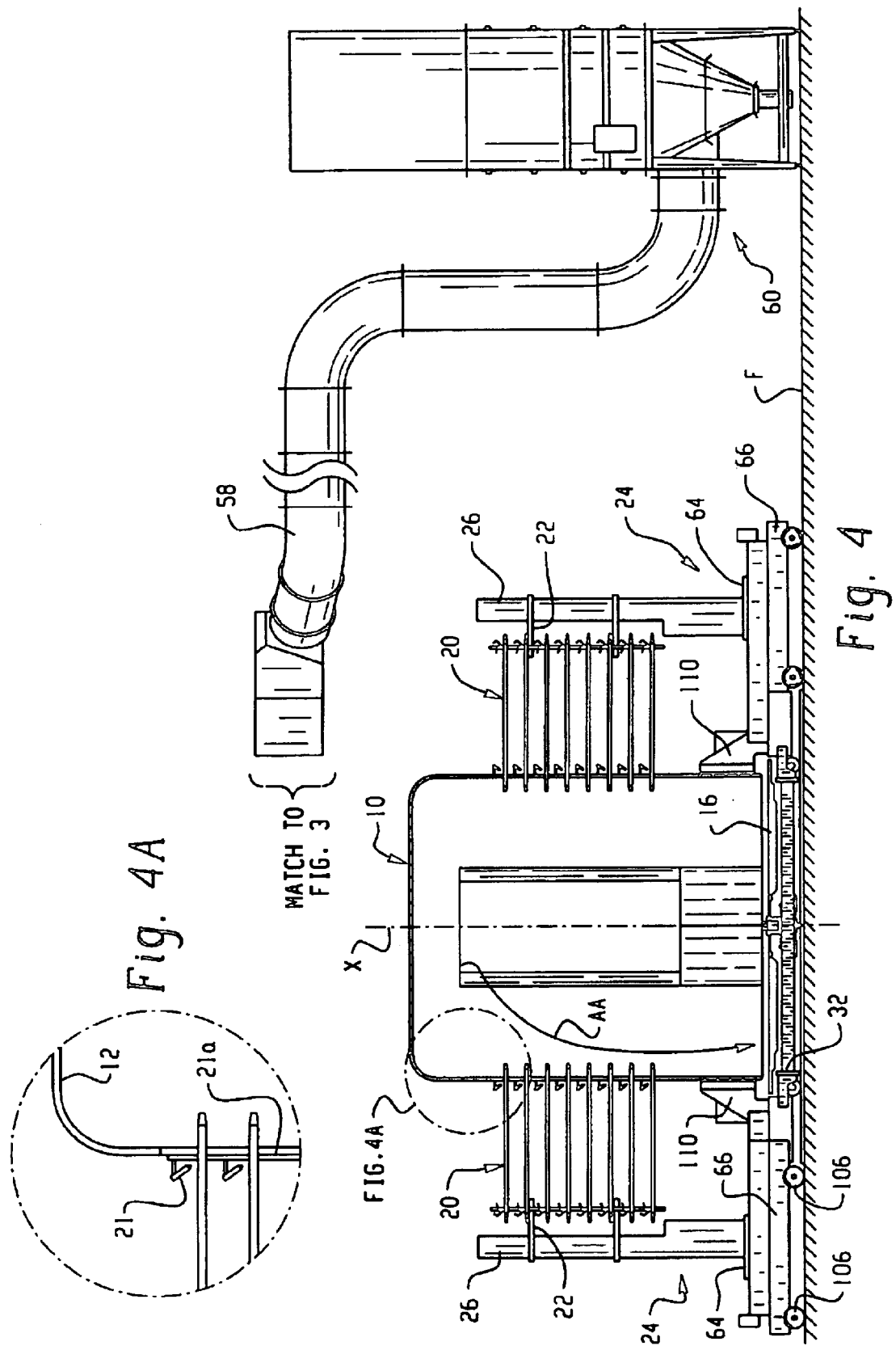

FIGS. 3 and 4 illustrate in plan a typical floor layout for the system 1 (the spray booth 10 is illustrated in vertical cross-section). Note that in FIG. 4 we illustrate the use of two gun movers 22. In this arrangement, the cyclone system 42 is connected to the outlet of the extraction duct 40 by a transition elbow duct 52. The powder laden air flows from the extraction duct 40, into the elbow 52 and up the vertical connecting ductwork 44 to the tangential inlet 54 of the cyclone 42. The cyclone system 42 includes a bypass plenum 56 that has a reclaim/non-reclaim bypass valve therein, which will be described further hereinafter. When the cyclone is in a "reclaim" mode of operation, the cyclone exhaust air, which typically still includes powder fines that were not removed by the cyclonic filtering action, passes through additional exhaust ductwork to a conventional afterfilter assembly 60 (FIG. 4). Powder that is separated by the cyclone 42 falls into a cyclone hopper 62 (FIG. 3) from where it can be manually removed and returned to the feed center 46 main hopper (not shown) or can be automatically transferred to the feed center 46 by positive air pressure and appropriate ductwork, valves and filters. In prior art systems, a pinch valve assembly (not shown) has sometimes been installed below the cyclone hopper 62 to control the transfer of the reclaimed powder from the cyclone 42 to the feed center 46. In the non-reclaim mode of operation, the cyclone system 42 is in effect taken off line by operation of the bypass valve, so that the powder laden air from the extraction duct 40 passes through the ductwork 44 and straight through the plenum 56 to the exhaust duct 58 and from there into the after-filter assembly 60. Note that the main blower (not shown) for producing the needed air flow within the booth 10, the extraction duct 40, the cyclone system 42 and the interconnecting duct work is physically located in the after-filter assembly 60. The main blower can be conveniently located elsewhere in the overall system as required.

FIG. 4 shows schematically some additional detail of a suitable gun mover 24. Note that the view angle of FIG. 4 is rotated from the view angle of FIG. 3 to show additional details, and that in FIG. 4 the cyclone system 42 has been omitted for clarity. The guns 20 are mounted on a frame or gun mount 22 which typically includes a number of tube lengths arranged horizontally and vertically to allow the guns 20 to be positioned as required. The oscillator 26 is supported on a moveable platform 64 that can translate back and forth on a base 66. The platform 64 is moved pneumatically or but other suitable means by the control system 48 so as to move the guns 20 horizontally into and out of the booth 10. The oscillator 26 moves vertically to allow the guns to be raised and lowered during a spraying operation. Preferably but not necessarily the gun mover bases 66 are supported on wheel assemblies 106 (FIG. 6) that allow the gun movers 24 to be rolled across the shop floor (see FIG. 6). This allows the gun movers 24 to be part of an overall modular spraying system in that various main components can be added on and separately assembled to the booth 10 and frame 30 assembly as required.

Figure 5:
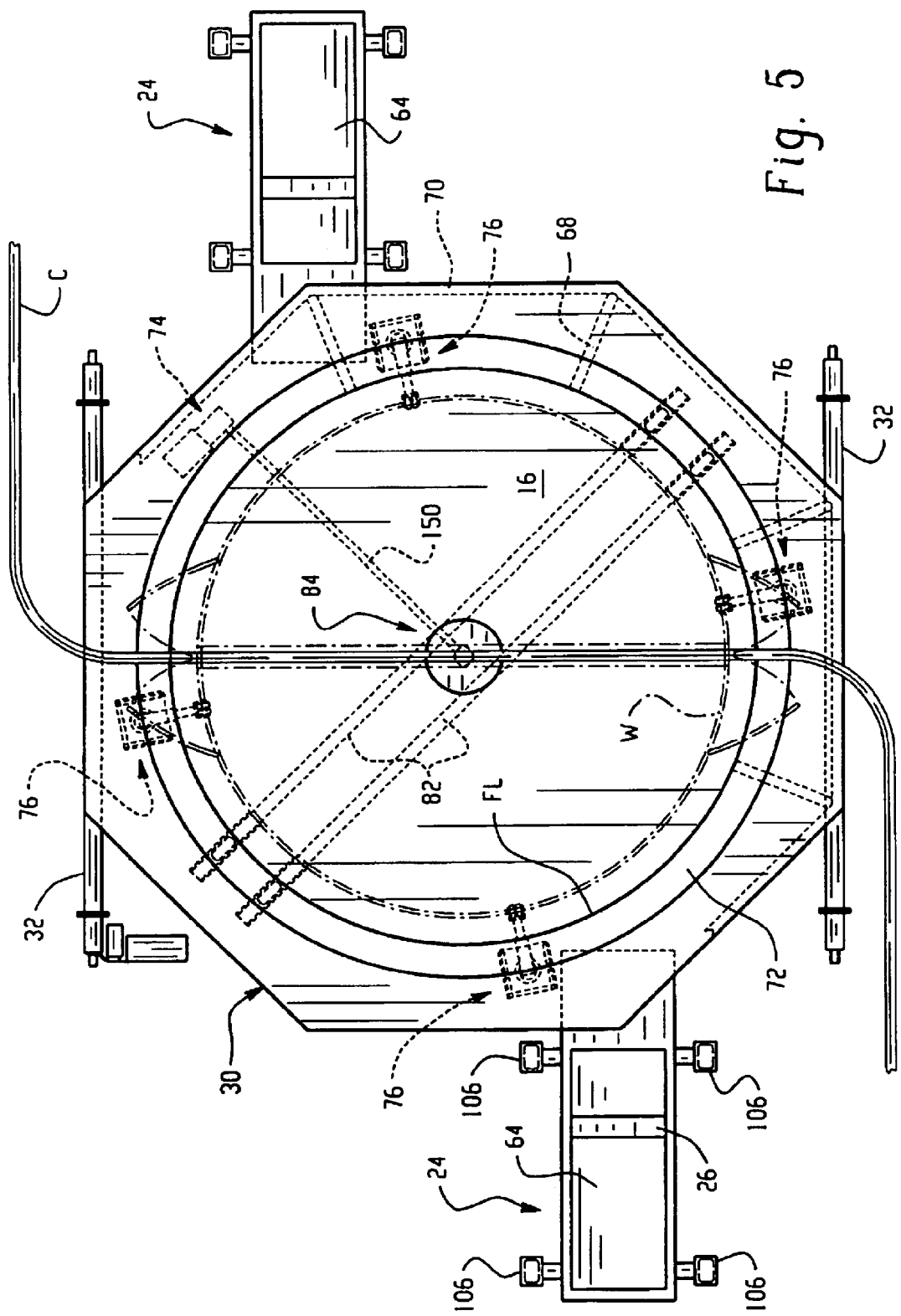
FIG. 5 is a plan view of a frame that supports a spray booth of the present invention.

With reference to FIG. 5, the support frame 30 is realized in the form of a octagonal framework although the actual geometry and configuration may be selected as required. The inner perimeter configuration of the frame 30 however is circular to accommodate the booth floor 16. The frame 30 includes a series of interconnected trusses 68 and frame bars or spars 70. A removable skirt or cover 72 is provided for aesthetics and to prevent accidental contact with the rotating floor 16. The frame 30 also supports various equipment such as a floor drive motor 74 and a series of four floor lifters 76. The bottom of the frame 30 rests on two parallel floor base support bars 32. As shown in greater detail in FIG. 6, the support bars 32 have wheels or casters 78 installed on each end. This permits the entire booth 10 and frame assembly 30 to be easily moved into position on the shop floor F.

The dashed lines W represent where the booth vertical canopy 12 walls align with the frame. The circle FL indicates the outer perimeter of the booth floor 16. Thus it is apparent that the floor 16 diameter is greater than the diameter of the canopy. In a typical booth, the canopy may be about 10 feet for example in diameter and the floor 16 may be about 11 feet in diameter. There is no practical restriction on the booth size however. The floor 16 extension past the canopy 12 wall acts as a fall-out pan so that powder that escapes through the gap between the floor 16 and the canopy 12 will alight on the extension. This amount of powder is typically going to be very small and consist mainly of fines and thus will tend to be drawn in by operation of the extraction duct 40, as well as a seal blow-off jet that will be described hereinafter.

A parallel pair of floor hub supports 82 extend across the inner perimeter of the frame 30. These hub supports are rigidly mounted to the frame 30. As will be further explained hereinafter, the floor 16 is mounted on the supports 82 via a hub assembly 84. Thus, the floor 16 is fully supported on the frame 30 as a unit separate from the canopy 12 to permit rotation and vertical movement of the floor 16 relative to the canopy 12.

The frame 30 supports a number of floor lifter units 76, which in this embodiment there are four lifters 76 evenly spaced around the frame 30. The basic function of the lifters 76 is to raise and lower the floor 16 vertically relative to the bottom edge of the canopy 12 walls. When the floor is raised, it is sealed against the bottom edge of the canopy 12. When in the lowered position, the floor 16 is free to rotate about the longitudinal axis X of the canopy, which is also the translation axis for the vertical movement of the floor 16.

As noted hereinbefore, the frame 30 also supports the ends of the extraction duct 40, and more specifically in this embodiment the transition duct to the cyclone system and the access door assembly at the opposite end. This permits the extraction duct to be supported in a position that is just above the top surface of the floor 16 when the floor 16 is rotating. The extraction duct 40 is not shown in FIG. 5.

Figure 6:
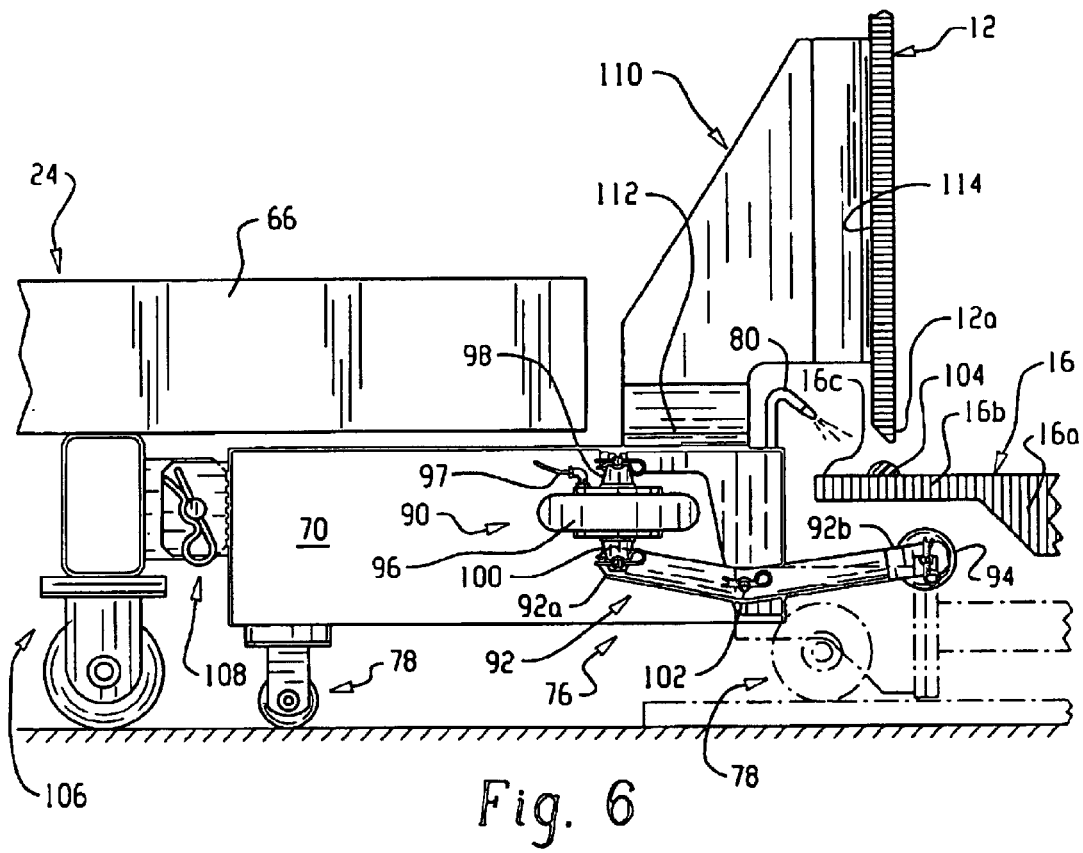
FIGS. 6 and 7 illustrate detail of a floor lift assembly for the spray booth, with the floor in the up and down positions respectively.
Figure 7:
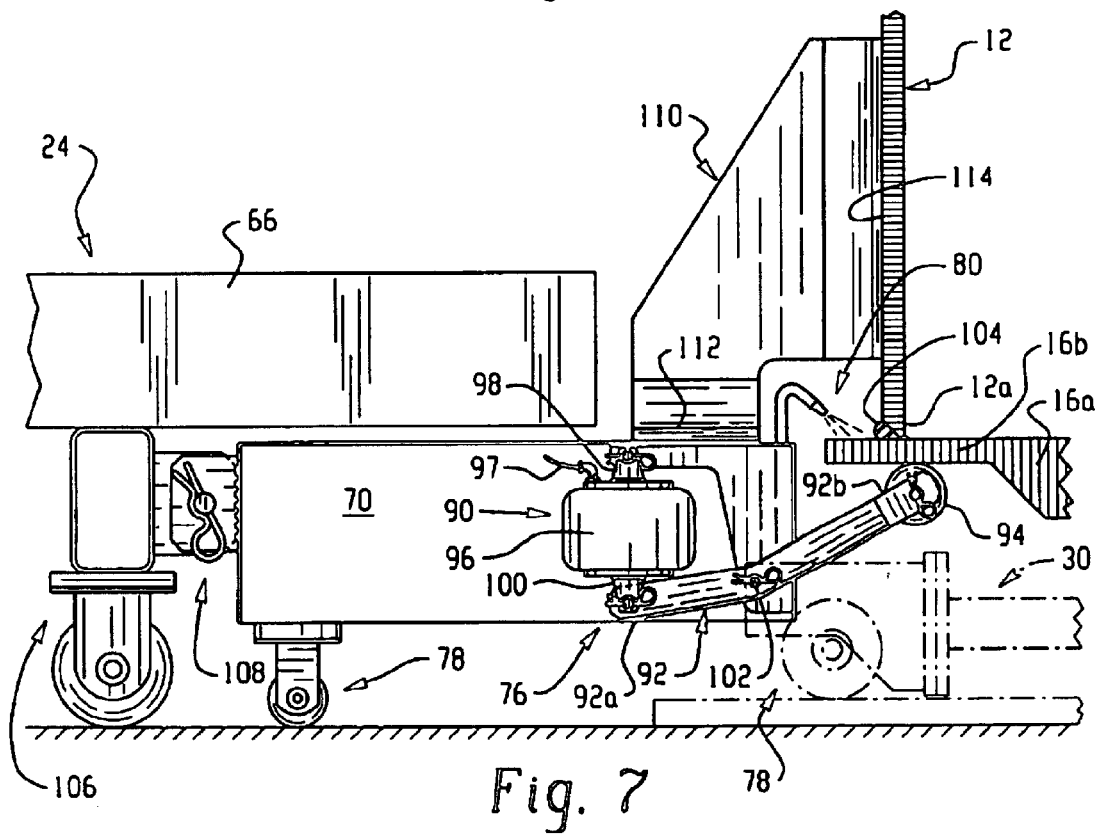

With reference next to FIGS. 6 and 7, the floor 16 includes a thicker middle section 16a and then at its periphery thins down to a rigid flange portion 16b. Four floor lifter units 76 are evenly spaced about the periphery of the floor 16 (see FIG. 5), and FIGS. 6 and 7 illustrate in detail one of the lifters 76, with the other three lifters being substantially the same. Although the lifter 76 design illustrated herein is a preferred design, those skilled in the art will readily appreciate that there are many available alternative ways to raise and lower the floor 16, especially since the displacement is rather short, on the order of about two inches or less. It is only necessary to lower the floor 16 from the canopy 12 to provide enough clearance so that the floor 16 can rotate freely. The smaller the gap between the floor 16 and the bottom of the canopy 12 wall 12a, the easier it is to contain powder from alighting beyond the canopy 12 wall periphery.

Each lifter 76 comprises three basic elements, namely a pneumatic actuator 90, a rocker arm 92 and a roller 94. In this embodiment, the pneumatic actuator 90 is realized in the form of a conventional air cushion shock commonly found in pneumatic suspension applications. The actuator 90 includes an inflatable bladder 96 that is supported by a pinned flange 98 on one of the trusses 70 of the frame 30. Pressurized air is supplied to the bladder 96 via an appropriate fitting and air hose assembly 97. The lower end of the bladder is attached or otherwise displaces a flange 100 that is pinned to a first end 92a of the rocker arm 92. The roller 94 is pinned to the opposite end 92b of the rocker arm and engages the underside of the floor 16 at the region of the floor flange portion 16b.

The rocker arm 92 is bent approximately at its middle and pinned at 102 to the frame 30 so as to be able to pivot about the axis of the pin 102. The control system 48 may be used to control the air pressure applied to the bladder 97, or this may be a manual control operation. In either case, all four lifters 76 are preferably but not necessarily actuated at about the same time in order to maintain the floor 16 generally level. When the bladder 96 is inflated by the application of pressurized air, the bladder 96 expands thus pushing down the flange 100 which pushes down the first end 92a of the rocker arm 92. This causes the rocker arm to pivot in a counterclockwise direction (as viewed from the illustration in FIG. 6). The counterclockwise pivoting action raises the roller 94 thus raising the floor 16. The floor 16 will be raised until it engages with the lower edge of the canopy wall 12a. This is the raised and sealed position of the floor 16 as shown in FIG. 6, and the floor is non-rotating when in the raised position. An elastomeric seal 104 or other suitable seal is disposed on the floor 16 and engages the lower end of the canopy 12a when the floor 16 is raised into sealing engagement with the canopy 12.

At least one air jet nozzle 80 is positioned on the frame 30 at the perimeter of the floor 16 to direct pressurized air at the seal 104 when the floor 16 is in its lowered position. This air jet 80 cleans the seal 104 of any overspray powder after cleaning activities inside the booth 10 are completed in preparation for a color changeover. The air jet 80 is not otherwise turned on as it is typically not needed. The nozzle 80 is preferably positioned near one end of the extraction duct 40 so as to blow powder from the seal 104 directly into the duct 40. The small air movement induced by the nozzle 80 will be sufficient to draw powder that has alighted on the floor 16 extension 16c outside the canopy 12 wall to be swept into the duct 40.

The circumferential elastomeric floor seal 104 is affixed to the floor 16 or carried on the bottom of the canopy 12 and forms an air tight seal between the floor 16 and the canopy 12 when the floor is in the raised position. Any suitable seal or gasket material may be used for the floor seal 104. This permits an operator to enter the booth 12 when the floor is in its raised position and use an air wand or other mechanism to blow powder off the canopy walls, ceiling and the extraction duct 40 without blowing powder out the booth between the floor 16 and the canopy 12 or having powder get trapped between the floor 16 and the canopy 12. This cleaning operation will typically be performed as part of a color change operation.

When the air pressure in the bladder 96 is relieved, the bladder 96 contracts and pulls up the first end 92a of the rocker arm, thus causing the rocker arm 92 to pivot clockwise (as viewed in FIG. 6). This rotation lowers the roller 94 and the floor 16 lowers under the force of gravity with the roller 94. The roller 94 lowers until it contacts the frame 30. As will be described herein shortly, the floor 16 is mounted on the hub assembly 84 that not only permits the floor to be rotated but also allow for this axial displacement of the floor 16 relative to the canopy 12.

FIG. 6 also illustrates that the gun mover base 66 may be supported on wheel assemblies 106 so that the gun movers 22 may be easily connected and disconnected from the booth frame 30. A pinned connection 108 maybe used to releasably connect the gun mover base 66 to the frame 30.

FIG. 6 illustrates another aspect of the invention. Since the floor 16 is rotated during spraying and color change/ cleaning operations, the canopy 12 and the ceiling 14 need to be supported separate from the floor 16. This is accomplished in the illustrated embodiment by the use of hanging knees 110 that are positioned around the frame 30. Each knee 110 includes a lower horizontal flange 112 that is bolted or otherwise secured to the frame 30. The knee 110 extends up then inward toward the booth 12. The knee further includes a vertically extending flange 114 that may be slightly curved to match the curvature of the canopy 12 wall. It is preferred although not required that the knees 110 are made of non-conductive composite materials, such as in accordance with the processes described in the above-referenced patent application. However, the knees 110 may be made from any non-conductive material provided that the knees 110 have enough rigidity and strength to support the canopy 12 and ceiling 14.

Each knee 110 is bonded to its respective portion of the canopy 12 outer wall surface. Any suitable bonding agent may be used and will be determined based on the materials of the knee 110 and the canopy 12. By this arrangement, the canopy 12 and ceiling 14 are fully supported just above the floor 16 (which extends under the canopy 12 wall as in FIG. 5) and there are no conductive bolts or plates or other elements that would attract the electrostatically charged powder. The use of the composite materials for the canopy 12 makes the canopy a fully self-supported structure that is cantilevered over the floor 16.

Figure 17:
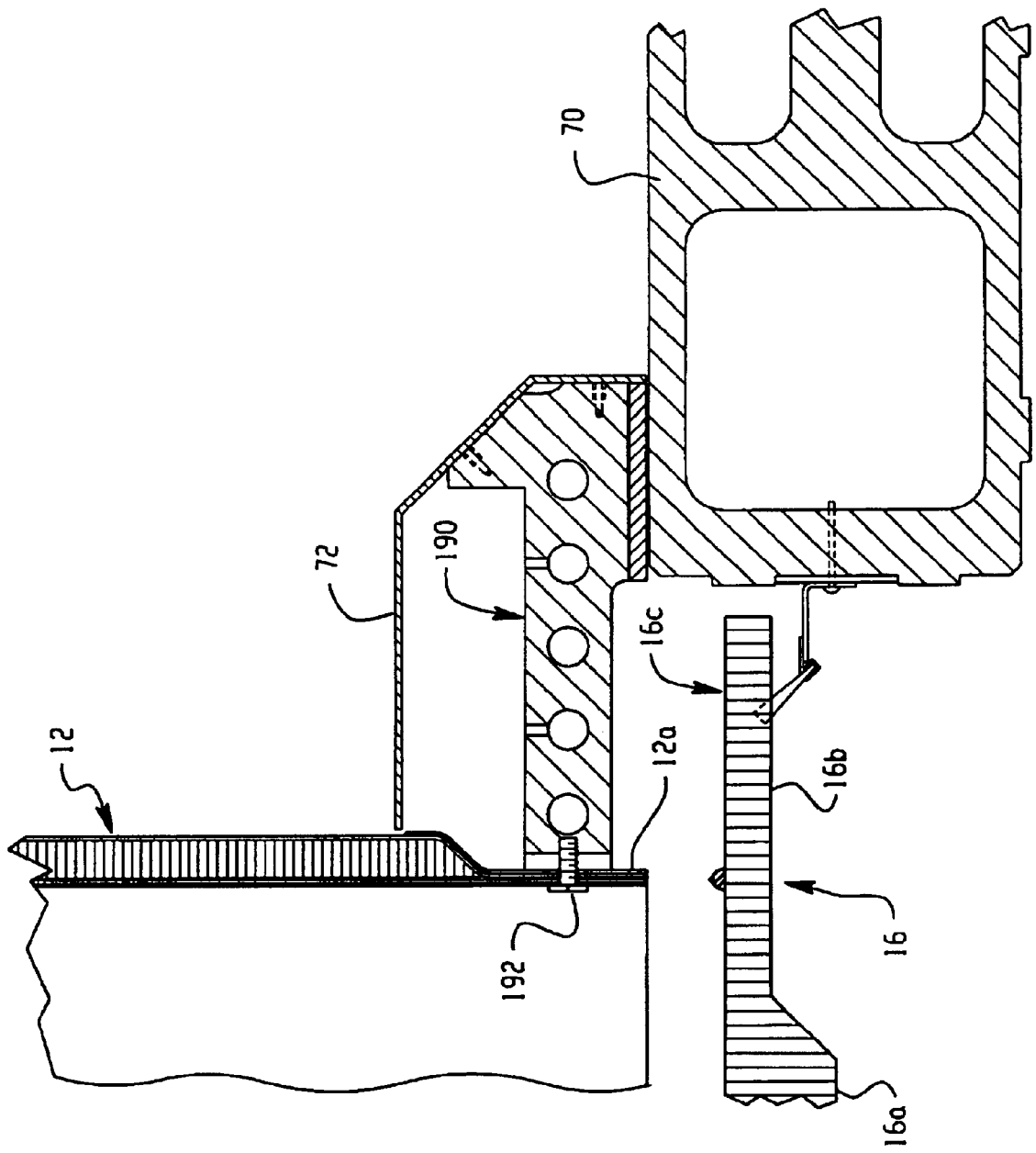
FIG. 17 is an alternative embodiment of a canopy support arrangement.
Figure 19A:
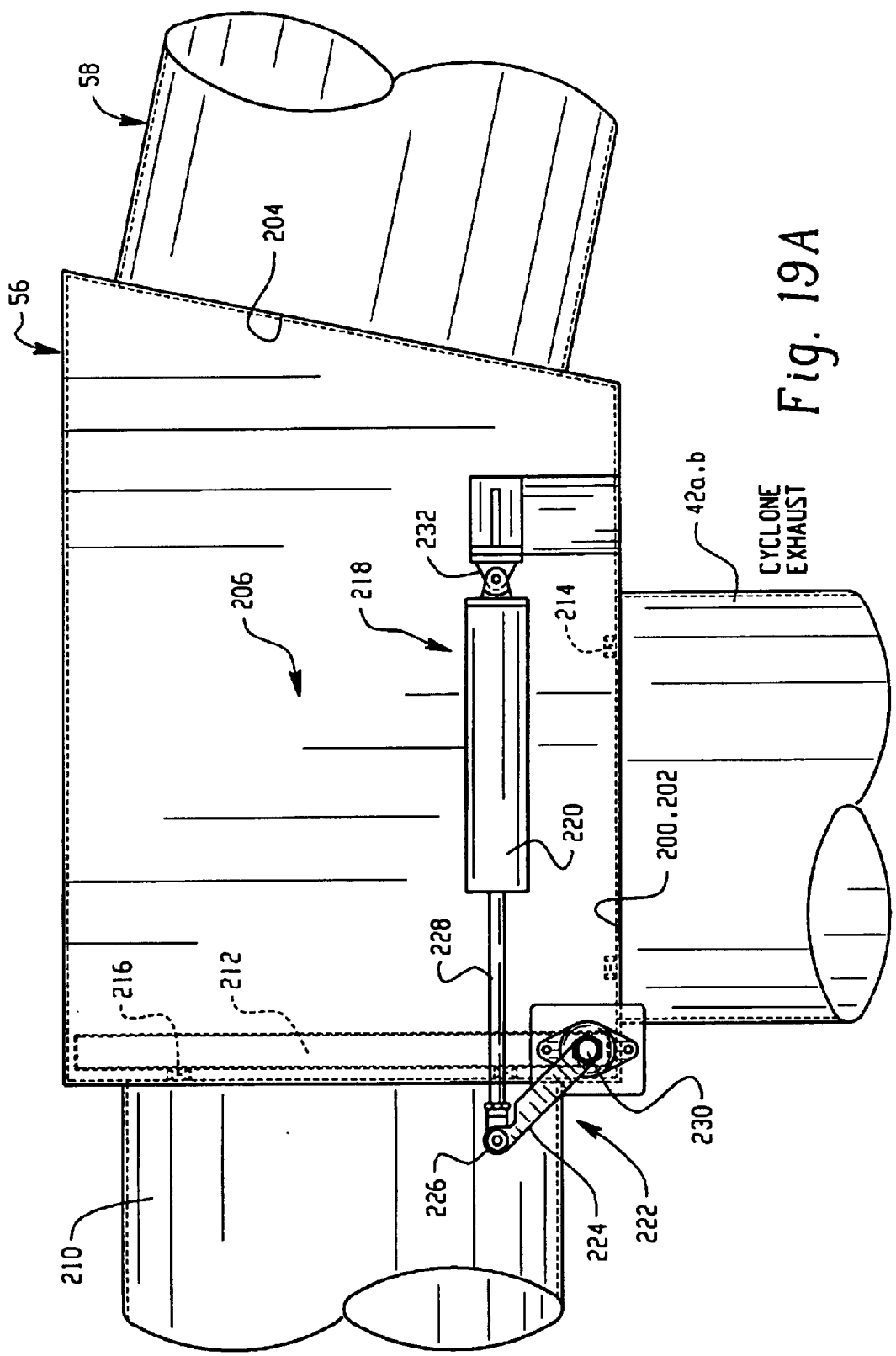
FIGS. 19A and 19B illustrate in elevation the bypass plenum of FIG. 18 with a bypass valve and actuator arrangement shown in two positions corresponding to a reclaim and non-reclaim mode.
Figure 19B:
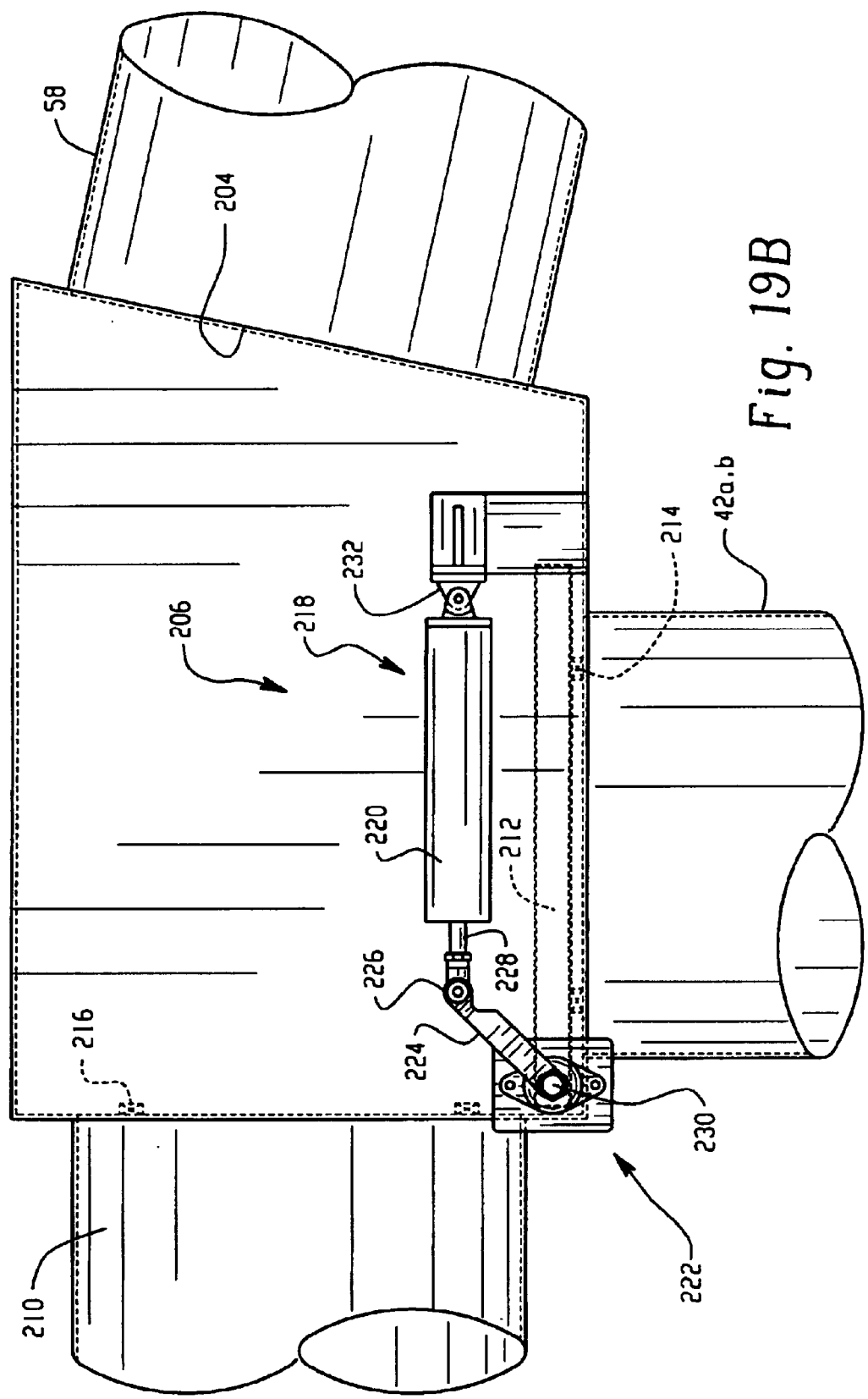

In an alternative embodiment illustrated in FIG. 17, the canopy 12 wall is attached to a plurality of hanging knees 190 by screws 192. In FIG. 17 the floor 16 is shown for reference purposes. Note in this embodiment that the lower end 12a of the canopy 12 wall is substantially reduced in thickness to provide a mounting flange that is attached to a flange on the hanging knee 190. Each knee 190 is also bolted to a corresponding support truss 70 or other firm structure on the booth support frame 30. FIG. 17 further illustrates the provision of the non-conductive plastic shroud 72 that overlays the frame 30 to keep dust out of the frame interior and for aesthetic value.

Figure 8:
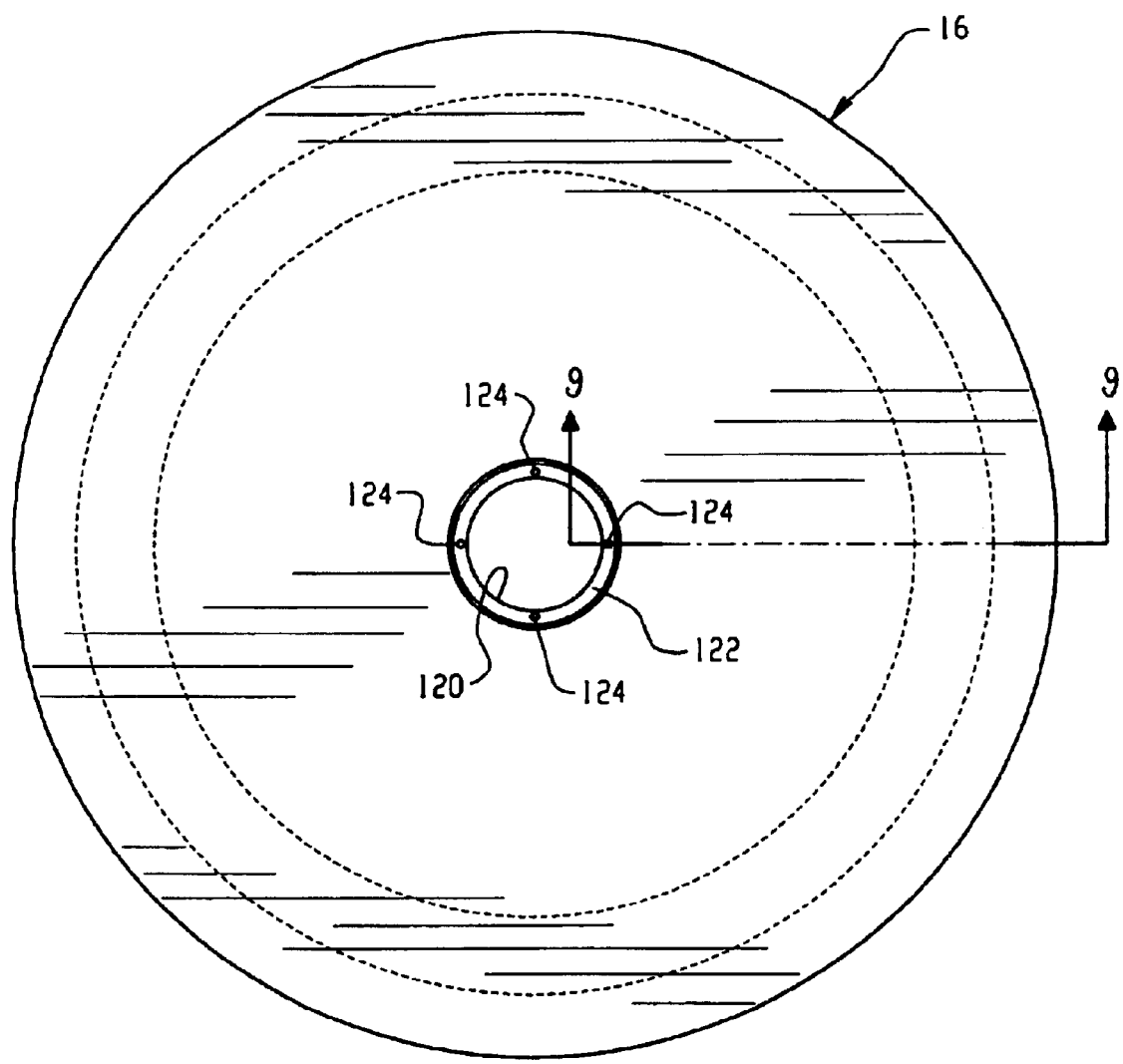
FIG. 8 is a plan view of the spray booth floor.
Figure 9:
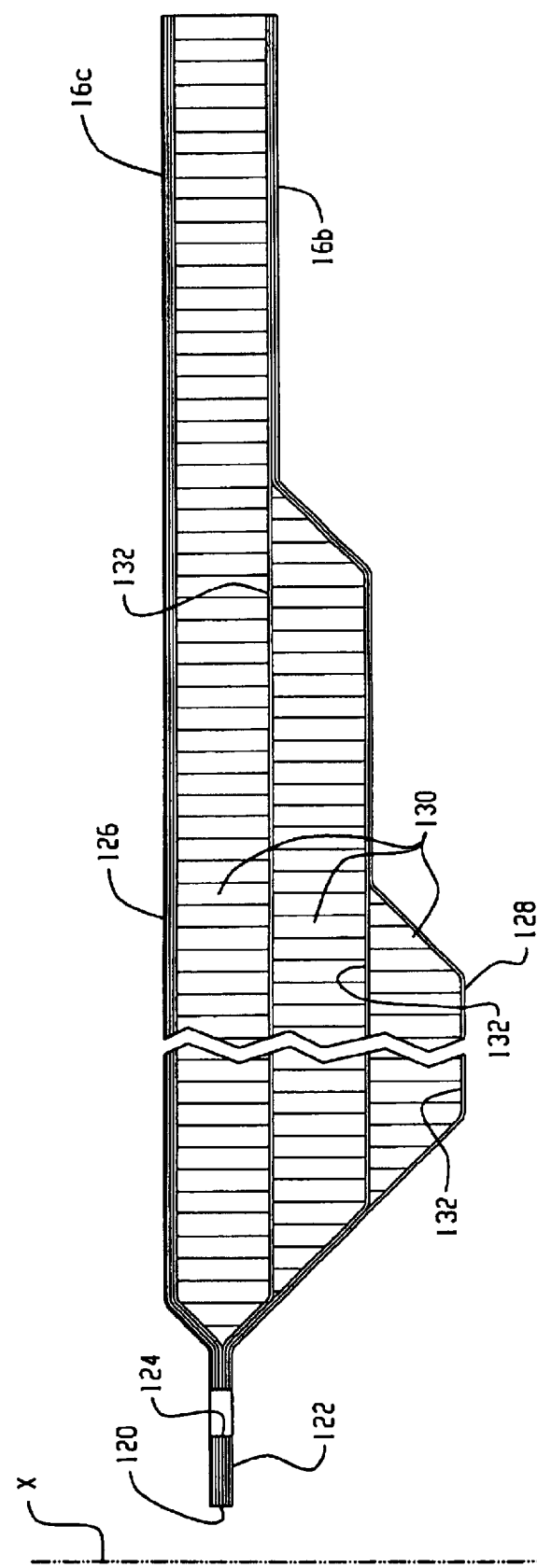
FIG. 9 is a cross-section of the floor taken along the line 9A—9A in FIG. 8.

With reference to FIGS. 8 and 9, the floor 16 is a multi-layer construction of composite materials. The floor 16 includes an inner hub hole 120 formed by an integral annular hub flange 122. As best shown in FIG. 9, the floor 16 is built up in a step-wise fashion so as to have its greatest thickness in the middle region of the floor 16. The layers are then step-wise eliminated such that the outer perimeter of the floor is formed by the flange 16b. With reference to FIGS. 8 and 9, the inner hub flange 122 includes four bolt holes 124 that receive mounting bolts to attach the floor 16 to the hub assembly 84. FIG. 9 further shows schematically the laid-up construction of the composite floor 16 when the floor is made in accordance with the processes described in the above-incorporated patent application. The floor 16 upper or active surface 126 is a layer of gelcoat while the underside surface 128 is a layer of epoxy barrier. In between these two layers are layers of PVC coring 130 and bidirectional fabric 132. The resulting floor 16 has very high strength and rigidity and very low conductivity, therefore, powder overspray will not easily adhere to the floor upper surface 126.

Figure 10:
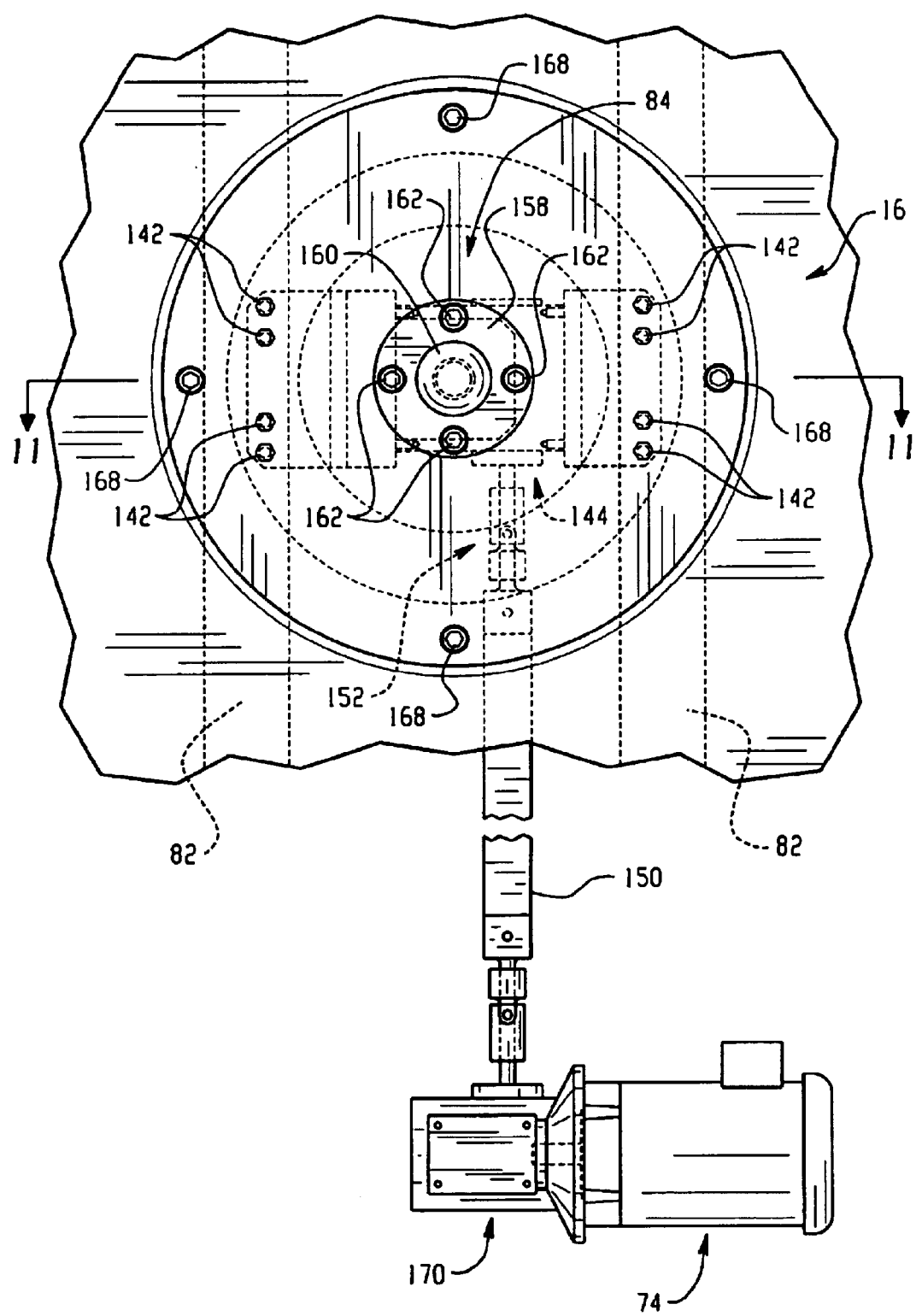
FIG. 10 is an embodiment of a floor hub assembly in plan.
Figure 11:
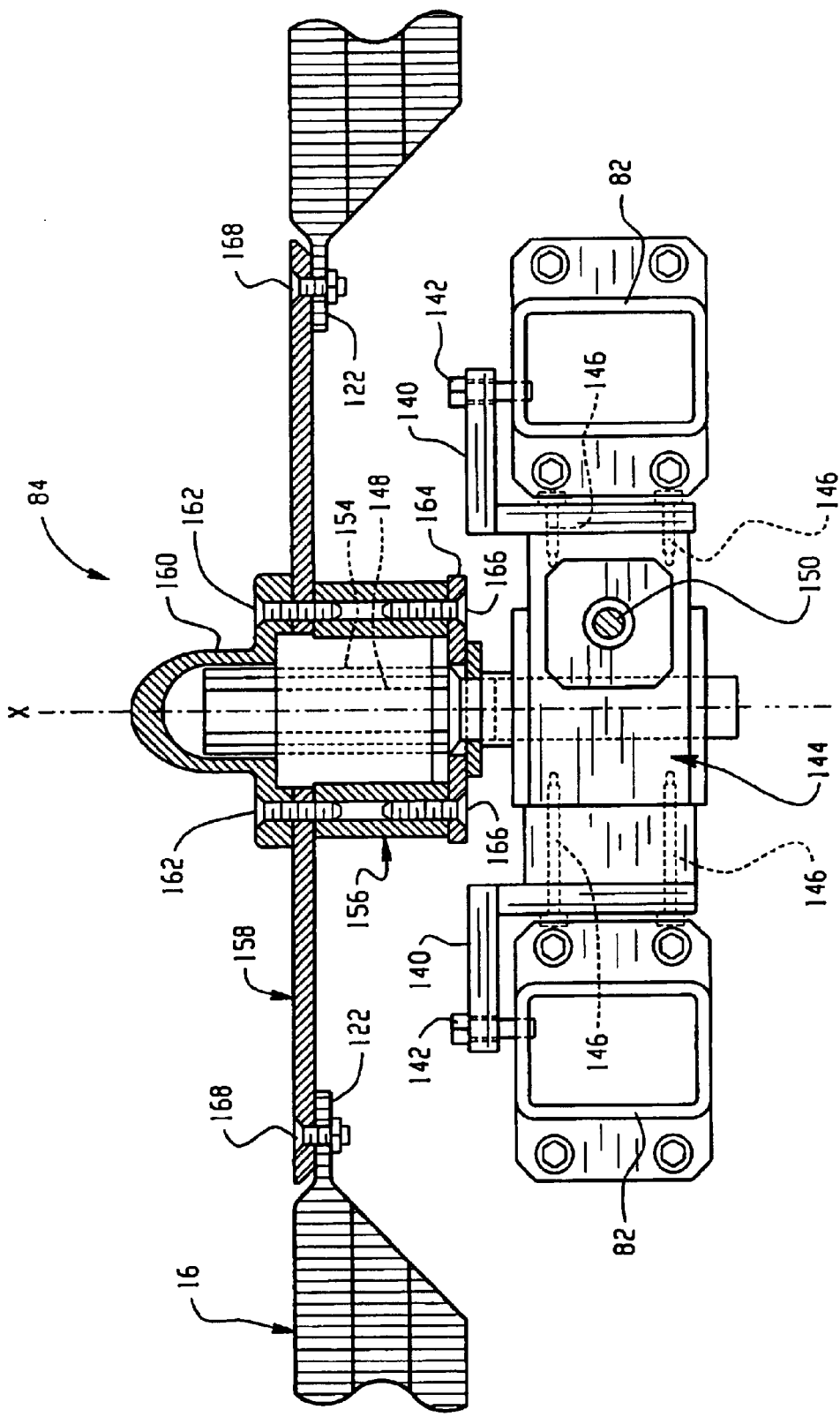
FIG. 11 is the hub assembly of FIG. 10 in vertical cross-section along the line 11—11 in FIG. 10.
Figure 12A:
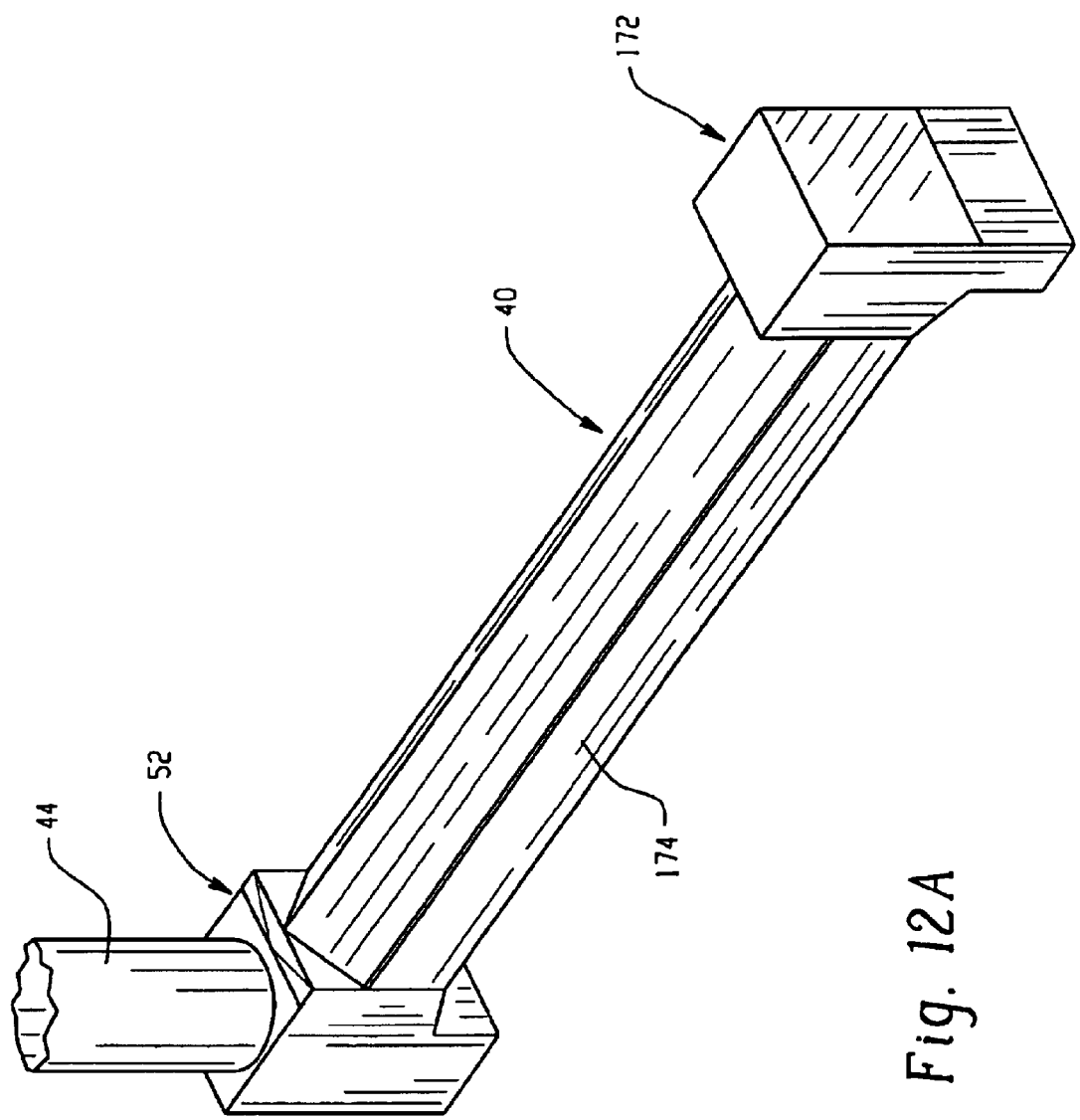

With reference to FIGS. 10 and 11, the hub assembly 84 is supported by the parallel hollow bar hub supports 82 which extend across the frame 30 (FIG. 5) and are mounted to the frame 30 by bolts or other suitable means (not shown). Mounted on each support bar 82 is a gear box support bracket 140. Each bracket 140 may be attached to its respective support bar 82 by bolts 142 for example. A gear reducer box 144 is mounted on the brackets 140 by bolts 146. The gear reducer 144 drives a spline shaft 148 in response to rotation of a drive shaft 150 that is coupled to the gear box 144 by a universal joint 152. The drive shaft 150 is turned by a ¼ horsepower motor 74 that is mounted on the frame 30 as described hereinbefore.

The spline shaft 148 meshes with a track ball spline 154 that has an inner spline for the spline shaft 148 and an outer spline that meshes with a coupling 156. The coupling 156 is mounted on an aluminum hub plate 158 by a cap 160 that is attached to the coupling 156 by bolts 162, and a collar 164 that is attached to the coupling 156 by bolts 166. The floor 16 is mounted on the hub plate by bolts 168 that pass through the floor hub flange 122 bolt holes 124 (FIG. 8).

By this arrangement, the motor 74 turns the drive shaft 150 through a gear reducer 170, with the drive shaft turning the spline shaft 148 through the gear reducer 144 that is mounted on the frame 30 via the support bars 82. The spline shaft 148 rotation thus rotates the floor 16 via the coupling 156. By use of the spline arrangement between the drive shaft 150 and the hub plate 158, the floor 16 can be axially translated along the axis X a limited distance as previously described herein under operation of the floor lifters 76. The control system 48 may be programmed to set or adjust the motor 74 speed and hence the floor 16 rotation speed.

With reference to FIGS. 12, 12A, and 13–14, the extraction duct 40 in this embodiment is a metal duct that is mounted on one end to the cyclone elbow duct 52 and at the other end to an access door duct 172. The cyclone elbow duct 52 and the access door duct 172 are both mounted on the frame 30 and support the extraction duct 40 just off the floor 16. For reference, the canopy 12 wall location is shown with dashed lines W in FIGS. 12 and 13, and the floor FL is also represented.

The extraction duct 40 includes a lower skirt 174 that tapers downwardly towards the floor 16 along the longitudinal axis of the duct 40. This taper is defined by an angle β. The extraction duct 40 is supported about two inches above the floor 16, and the small optional taper β is used to maintain a constant air flow pattern through the duct 40. Without the taper, the higher negative air pressure closest to the cyclone inlet 52 would cause an uneven flow pattern within the booth. When the floor is in the raised position, there is only a very small or zero gap between the duct 40 and the floor 16 at the cyclone duct 52 end, and about two inches at the opposite end. Thus at its maximum when the floor 16 is lowered, the opposite end has about a four inch or less gap between the bottom of the duct 40 and the floor 16.

Figure 14:
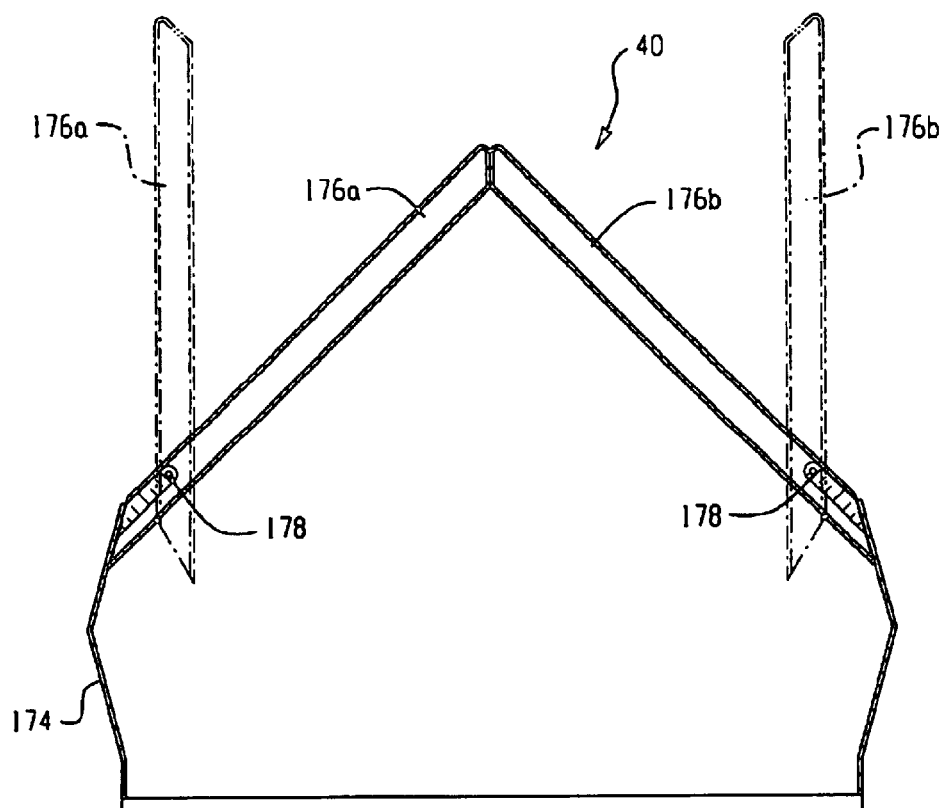
FIG. 14 is a cross-section of the extraction duct of FIG. 12 along the line 13—13 in FIG. 12.

As best illustrated in FIG. 14, the duct 40 further includes two doors 176a and 176b that are attached to the skirt 174 by suitable hinges 178. The hinges 178 allow the doors 176a,b to open as illustrated in phantom in FIG. 14 to prevent excessive pressure build-up in the duct 40. Pressure can build up inside the duct 40 when the floor 16 is in the raised position during booth cleaning and as part of a color change operation. But under normal operating conditions, the doors 176a,b are closed and held closed by the negative air pressure within the duct 40. As the floor rotates under the duct 40, powder on the floor 16 is drawn up into the air stream inside the duct 40 and carried out to the cyclone system 42.

Figure 15A:
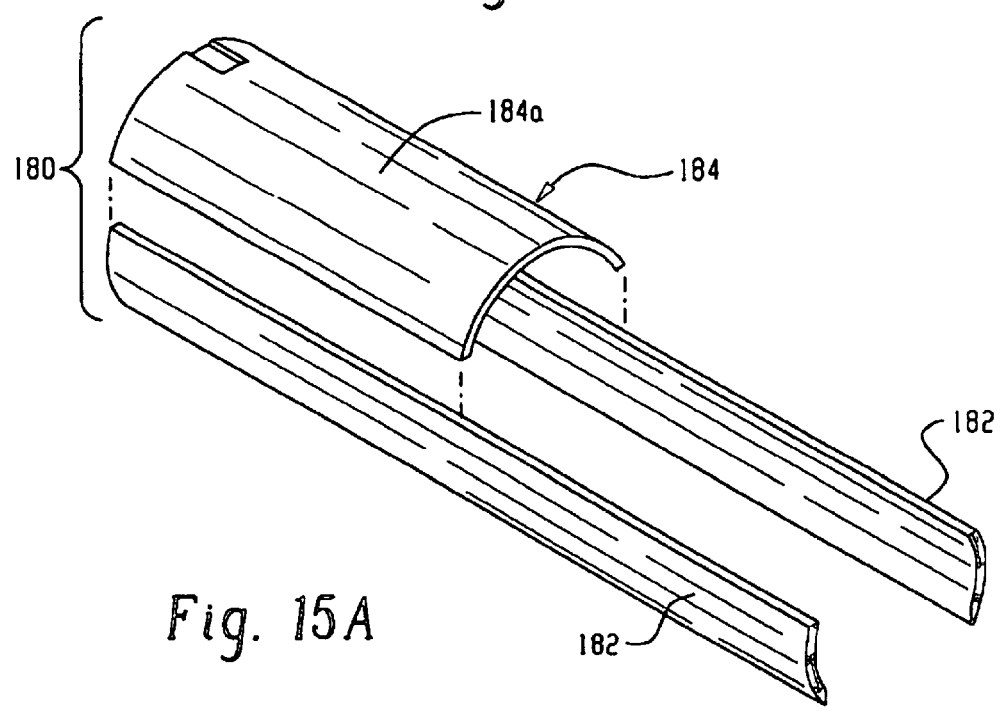
FIGS. 15A and 15B illustrate an alternative embodiment of an extraction duct, illustrated in exploded perspective in FIG. 15A and in perspective as assembled in FIG. 15B.
Figure 15B:
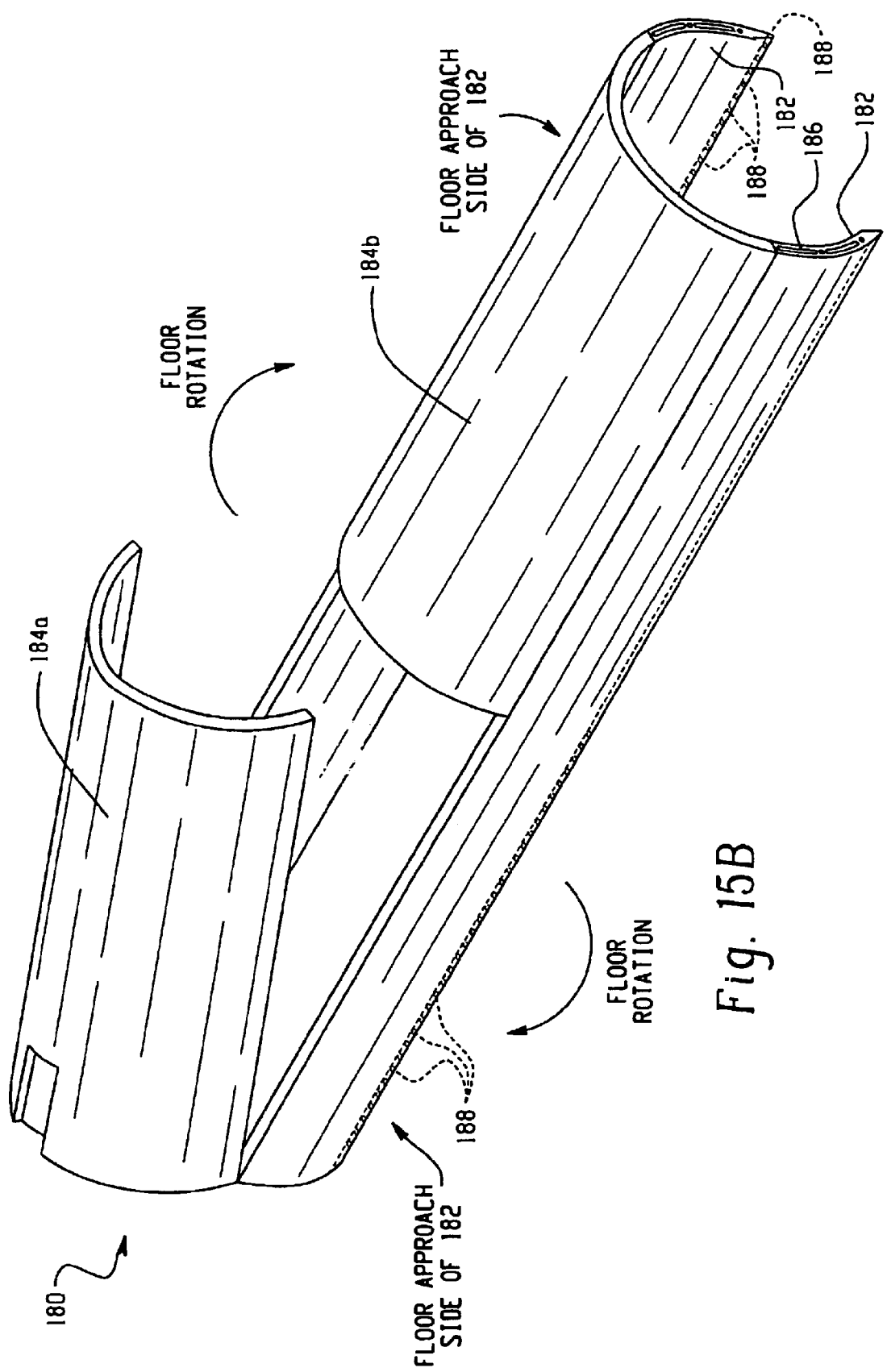
Figure 16:
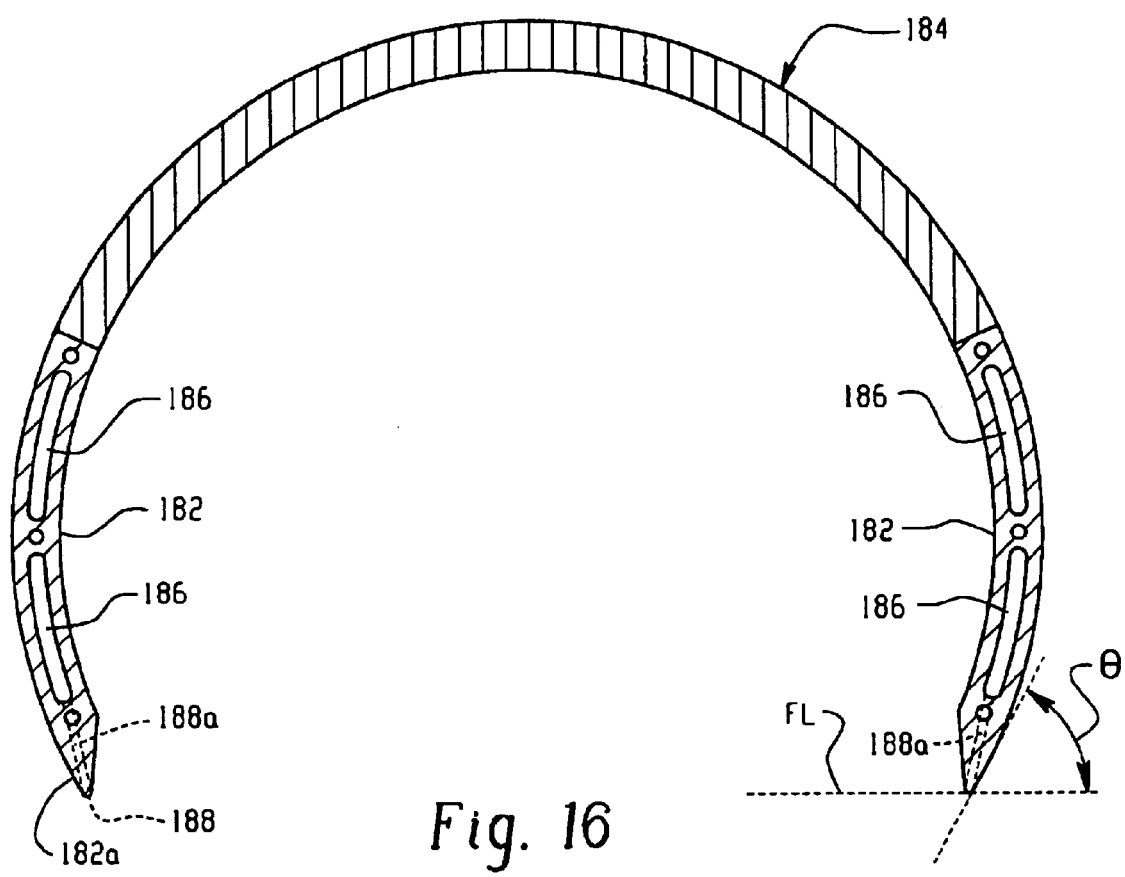
FIG. 16 is the extraction duct of FIG. 15 shown in lateral cross-section.
Figure 16A:
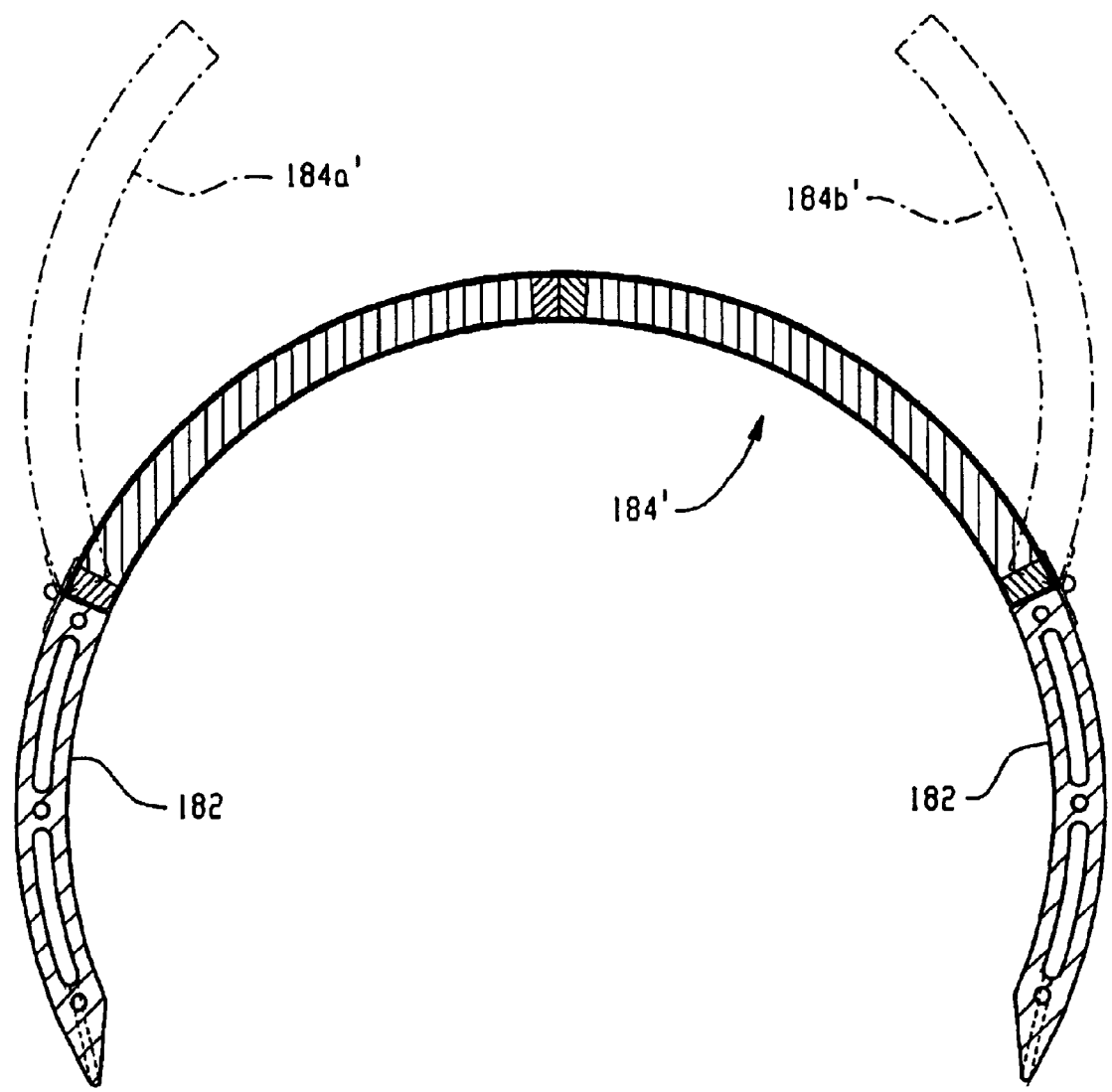
FIG. 16A is an alternative embodiment of the extraction duct of FIGS. 15A and 16, shown in lateral cross-section.

With reference to FIGS. 15A, 15B and 16, in an alternative embodiment the extraction duct 180 may be partially made of composite materials similar to the materials used for the booth 12. The duct 180 includes two longitudinal metal rails 182 that extend in parallel across the floor 16 and that are joined at the top by a cover 184. The rounded cover reduces powder buildup on the duct 180 and therefore is preferably but not necessarily made of composite very low conductivity materials. In contrast to the embodiment of the all metal duct 40, the cover 184 is a two piece cover 184a,b with each half hinged at the outer longitudinal ends thereof. The covers thus lift vertically from the lengthwise center point of the duct 180 when open as illustrated in phantom in FIG. 15B and extend up along the canopy wall. FIG. 16A illustrates another alternative embodiment in which the composite cover 184' comprises two halves 184a' and 184b' that are hinged lengthwise in a manner similar to the embodiment of FIG. 14. As in the embodiment of FIGS. 15 and 16, the composite cover 184' of FIG. 16A may, for example, be made using the processes for making the composite booth 12.

The duct 180 is mounted above the floor 16 and may be installed in a manner similar to the all metal duct 40 embodiment. In accordance with another aspect of the invention, in some applications it may be required to apply additional force to the powder residue that adheres to the floor 16 if the suction from the duct is insufficient to thoroughly dislodge the powder. In the embodiment of FIGS. 15 and 16, the composite duct 180 may be formed with internal air passageways 186 within the rails 182 through which pressurized air is supplied (not shown). Each rail 182 is arcuate in shape so as to include an end portion 182a that lies on a tangent T that forms an included angle θ with the floor 12. The angle θ is preferably less than ninety degrees.

A series of air jets or orifices 188 are formed in the bottom of each rail 182 and are in fluid communication via passageways 188a with the air passageways 186 such that pressurized air is directed out of each orifice 188 against the floor but at an angle that causes powder on the floor 12 to be blown into the extraction duct 180 interior. The orifices 188 are spaced along the lower edge of each rail 182 on the approach side of the extraction duct 180, thus for each rail 182 the orifices 188 are provided only on one half of each respective rail but a complete line of orifices extend across the entire booth floor 16. This positive pressure air from the jet slots 188 augments the powder removal suction caused by the negative air pressure flow within the duct 180. The pressurized air from the orifices 180 will tend to assist in dislodging powder overspray particles that may have adhered to the floor 12 and cannot be drawn up by the negative air pressure flow from the duct 180. The alternative duct 180 embodiment need not be made of the same materials as the booth 12, however, use of such materials will result in minimal collection of powder overspray on the duct 180.

Cyclone Bypass Valve

With reference again to FIG. 3, it is sometimes desired to be able to select whether the powder spraying system 1 operates in a powder reclaim or non-reclaim mode. For example, the system 1 may be operated in a non-reclaim mode when the powder overspray cannot be returned to the feed center for re-use. Since the reclaim powder mode of operation involves the use of the cyclone system 42, it is necessary to in effect take the cyclone 42 "off-line" for the non-reclaim mode.

Figure 18:
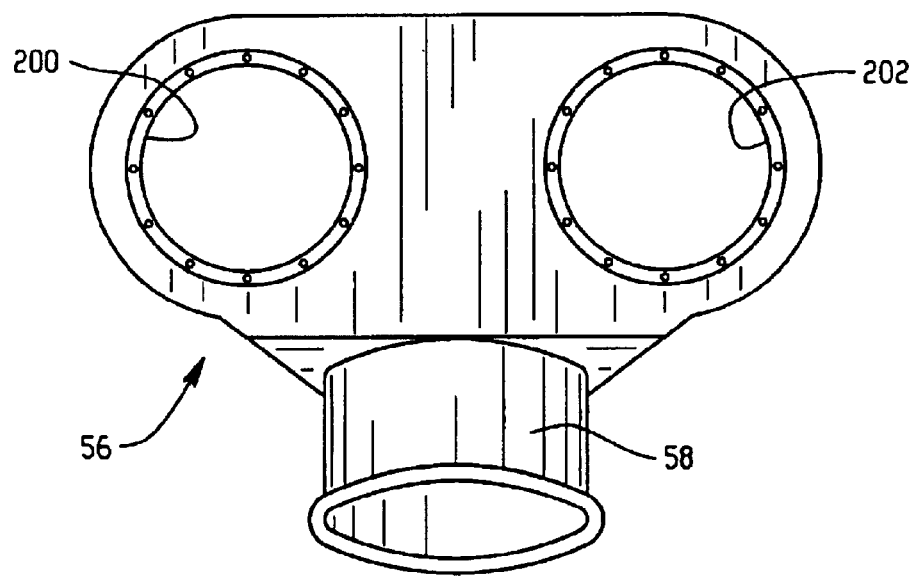
FIG. 18 is a bottom view of a bypass plenum.

FIG. 18 shows a bottom view of the bypass plenum 56. Each of the twin cyclones 42*a,b* have circular exhaust openings that align with openings 200 and 202 in the bypass plenum 56. In the reclaim mode, exhaust air from the cyclones 42*a,b* enters the bypass plenum 56 through the openings 200 and 202 and passes through the plenum outlet or exhaust opening 204 to the after-filter ductwork 58. In the non-reclaim mode, the openings 200, 202 are closed off by a bypass valve assembly 206.

With reference to FIG. 3, the vertical ductwork 44 that connects the extraction duct 40 to the cyclone system 42 is connected to a plenum manifold 207 that includes a first duct 208 that is connected to the cyclone inlet 54 (keeping in mind there are two such inlets when twin cyclones are used) and also includes a cyclone bypass duct 210. The bypass duct 210 extends over the top of the cyclone system 42 and is connected to the bypass plenum 56.

With reference to FIGS. 19A and 19B, the bypass valve 206 includes three basic components, namely a valve door 212, seals in the form of a pair of cyclone outlet seals 214 and a bypass duct seal 216, and a valve actuator mechanism 218. The valve door 212 is disposed within the bypass plenum 56 and is therefore shown in phantom in FIGS. 19A and B, whereas the valve actuator mechanism 218 is disposed outside the bypass plenum 56. In FIG. 19A the valve door 212 is shown in the cyclone open position and in FIG. 19B the valve door 212 is shown in the cyclone closed position which correspond in this embodiment to the reclaim and non-reclaim modes respectively.

The seals 214 and 216 are, for example, conventional D-seals. The cyclone seals 214 are installed on the plenum 56 around each of the cyclone openings 200, 202. Alternatively, the cyclone seals 214 may be installed on the valve door 212. The bypass plenum seal 216 may also be a D-seal and is installed in the plenum 56 around the opening between the bypass duct 210 and the bypass plenum 56. Again, alternatively, the duct seal 216 may be installed on the valve door 212 rather than the plenum 56 wall.

When the valve door 212 is in the upright or cyclone open position, the valve door 212 seals and isolates the bypass duct 210 from the bypass plenum 56. The cyclone exhaust outlets are also open to the bypass plenum 56 via the openings 200, 202. As a result, the powder overspray laden air from the extraction duct 40 passes into the cyclone inlets 54 whereby much of the powder is separated from the air stream and drops to the lower collection regions of the cyclones. The cyclone exhaust air, which may still contain powder fines, flows through the after-filter ductwork 58 to the after-filter assembly 60 (FIG. 4).

When the valve door 212 is in the down or cyclone closed position (FIG. 19B), the door 212 seals off and isolates the cyclone exhausts from the bypass plenum 56. The bypass duct 210 however is now open to the bypass plenum 56. When the cyclone exhausts are sealed off, the cyclone system 42 is non-operational and represents a high pressure impedance to the flow of air into the cyclone inlets 54. As a result, the powder laden air from the extraction duct 40 bypasses the cyclone inlets 54 and passes through the bypass duct 210, then straight through the bypass plenum 56 into the after-filter ductwork 58 and finally to the after-filter assembly or other waste receptacle.

The valve actuator mechanism 218 in this embodiment is realized in the form of a pneumatic piston type actuator 220 and a bell crank assembly 222. The bell crank assembly 222 is a lever 224 that is connected at its free end 226 to an actuator rod 228, and at its opposite or pivot end 230 is connected to the valve door 212 through the plenum 56 wall. The actuator 220 is pivotally connected to a mounting bracket 232 so that the actuator 220 is free to rotate slightly to avoid binding as it pushes and pulls on the bell crank lever 224. The actuator 220 may be controlled by the control system 48, or alternatively may be controlled by manual operation of a pressure valve. Still further, the valve door 212 could be manually moved, but an actuator is preferred to assure a good seal when the door 212 is in each position.

FIGS. 20 and 21 illustrate one embodiment of the valve door 212. The door 212 includes two faces 212*a* and 212*b* each of which will overlay respective openings 200, 202 to seal off the cyclone 42 when the door 212 is in the non-reclaim position, and cover the inlet from the bypass duct 210 when the door 212 is in the non-reclaim position. The door 212 is formed of a piece of sheet metal 232 that is bent around an actuator bar 234. One end of the actuator bar 234 is connected to the pivot end 230 of the bell crank lever 224 (FIG. 19). The door 212 is enclosed at its end and top with additional sheet metal and then injected with foam for strength and rigidity. In an alternative form of the door 212, a pair of doors may be used that individually pivot to close each cyclone exhaust opening. In this alternative, a separate third door may be needed to close off the bypass duct 210 when the system 1 is used in the reclaim mode.

It should be noted that the cyclone bypass valve concept may be used in any powder spraying system that utilizes a cyclone separator system. The bypass valve arrangement is therefore not limited to use in a system that uses other aspects of the system described herein such as, for example, the embodiments of the spray booth 10.

Composite Extraction Duct

With reference to FIG. 16A, in some cases the composite covers 184' can have powder adhere to the inside surface of the covers due to high velocity powder entrained airflow flowing through the duct. The high velocity powder in the airflow may also produce a tribocharging effect which can further cause powder particles to adhere to the inside surface of the duct. Moreover, electrostatically charged overspray powder particles and fines may adhere to the outside surface of the composite covers 184' because there is no mechanism for discharging the surface charge of the covers 184'. Even though this amount of powder is quite small, nonetheless in some applications it necessitates additional cleaning of the surface of the duct during a color change operation.

Figure 22:
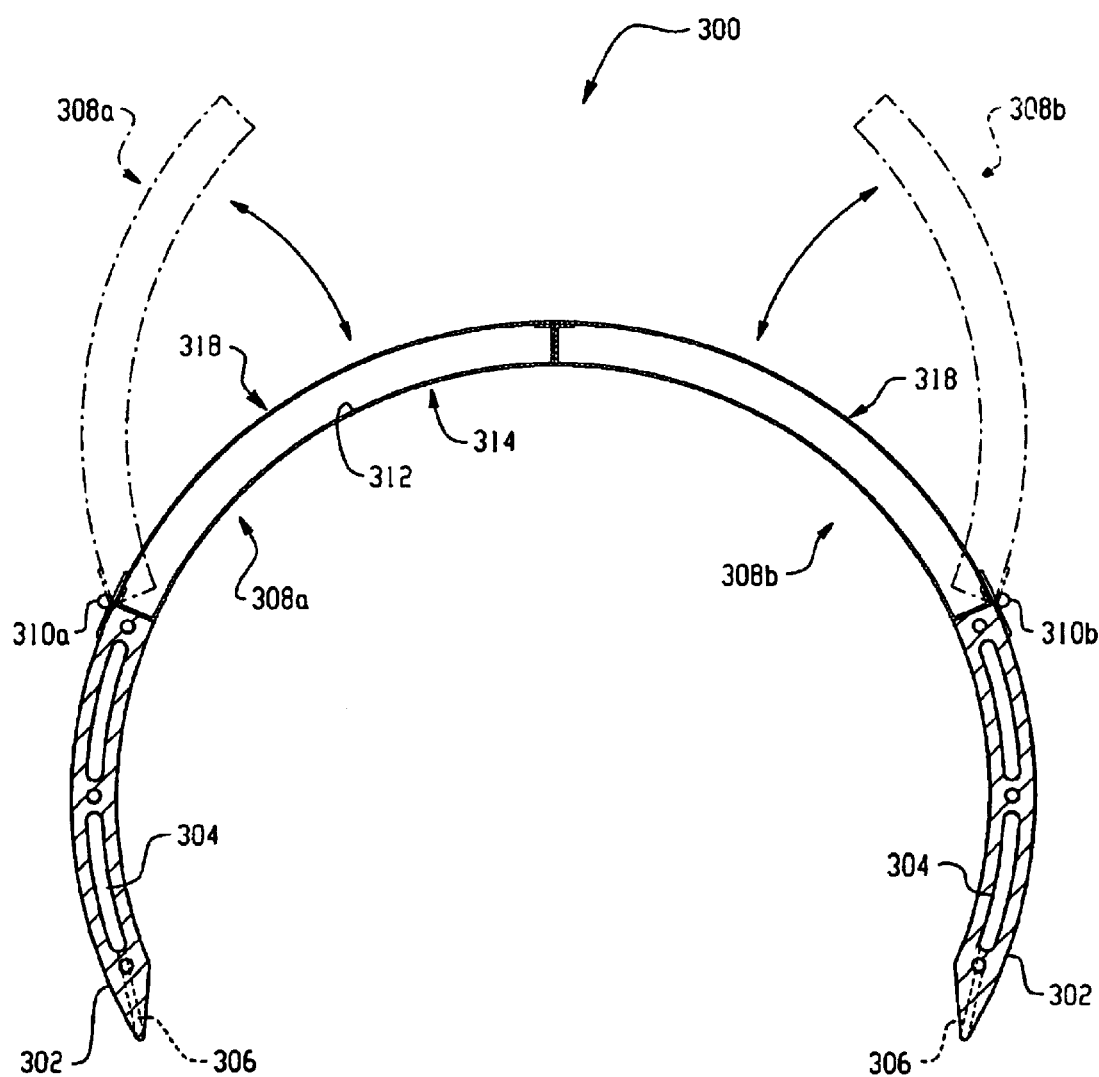
FIGS. 22, 23, 23A and 24 illustrate an alternative embodiment of a powder extraction duct.
Figure 23:
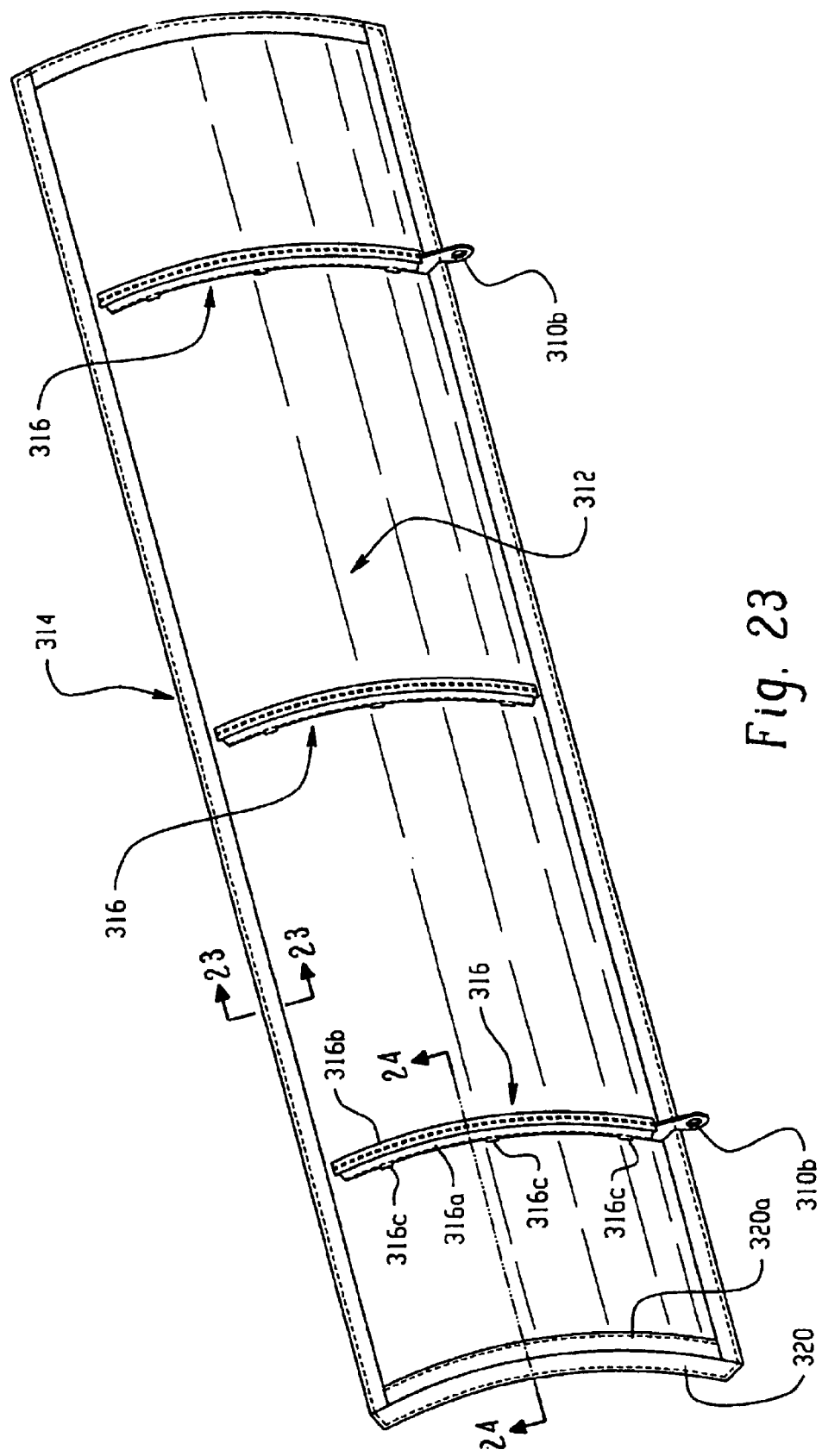
Figure 24:
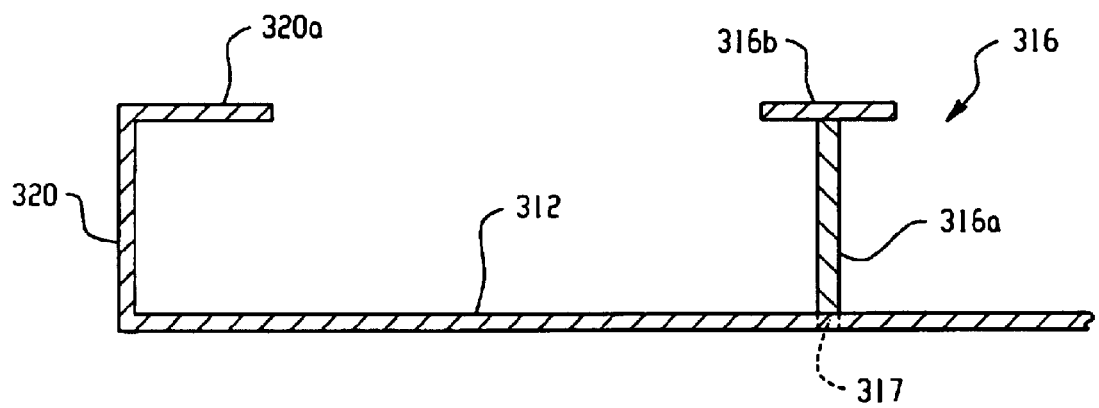

With reference to FIGS. 22–24, another embodiment of the invention is illustrated which reduces and substantially eliminates the surface charge collection on the duct covers, such that any powder initially alighting on the cover surface immediately falls off or is very easy to blow off with pressurized air. In accordance with this aspect of the invention, powder particles are disassociated from any electrostatic charge that might have become associated with the powder particles during an electrostatic spraying operation. Although the illustrated embodiment shows a rounded duct, the duct may take on other suitable geometric configurations.

In this embodiment, a powder extraction duct is indicated generally by the reference numeral 300. The duct 300 is similar in some respects to the embodiment of FIG. 16A, the description of which need not be repeated. Accordingly, the duct 300 includes two lengthwise rails 302 which may be made, for example, from aluminum or other suitable material. The rails 302 include air passages 304 and a plurality of air jets 306 therein in a manner and for the purposes previously described herein.

The duct 300 includes a composite cover 308 having two halves 308a and 308b. These cover halves are joined to their respective rails 302 by a suitable hinge joint arrangement 310a and 310b to allow the covers 308 to be swung open as illustrated in phantom and the directional arrows. The covers are hinged lengthwise. Alternatively the cover halves 308a,b may be hinged at either end thereof, similar to the embodiment of FIGS. 15A, 15B and 16.

Each cover half is the same construction. The cover is distinguished from the other embodiments herein in that the covers 308 are now formed of a metal or otherwise conductive inner surface 312. In this example, the surface 312 is formed or otherwise provided on a base 314. The base 314 may be made, for example, by an arcuate stainless steel fabrication 314, however, any conductive material may be used, and alternatively the conductive surface 312 may be provided on a non-conductive base or substrate. The base 314 includes a series of support ribs 316 that support a non-conductive arcuate skin 318. The supports 316, for example, may each include a leg 316a and a conforming support plate or shelf 316b. The conductive outer layer or skin 318 overlays the supports 316b to form a generally hollow cover structure. The skin 318 may be bonded or otherwise attached to the support shelves 316b. The specific shapes of the supports 316 is not critical to the invention. Any suitable support mechanism may be used to form the hollow covers 308a and 308b. In this example, the supports 316 may be integrally formed with the conductive base 314. End risers 320 may be formed by additional partial supports and are provided to substantially enclosed the cover structures if so desired. The supports 316 may extend widthwise across each cover half (FIG. 23).

Figure 23A:
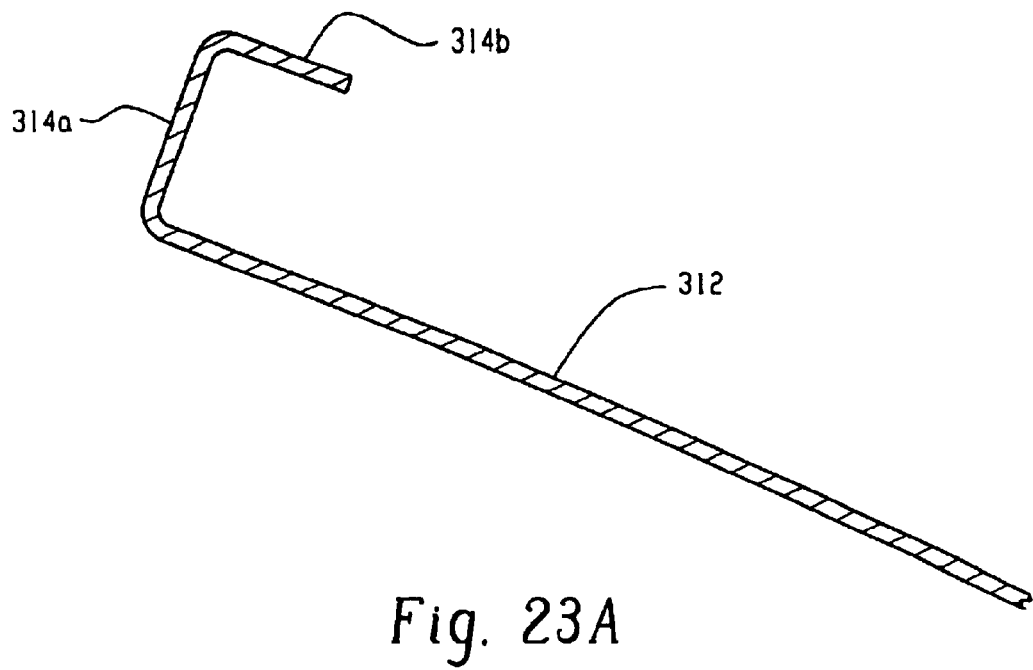

The end risers 320 include a conforming upper plate 320a. In order to form an air tight enclosure, the end plates 320 and upper plates 320a may be welded to the base 314. As illustrated in FIG. 23A, the lengthwise sides of the base 314 also include a riser portion 314a and a conforming upper plate 314b. Thus, when the non-conductive layer 318 is bonded over the base 314, a box-like, air tight generally hollow enclosure is formed. Each rib 316 may include location tabs 316c that insert into slots (not shown) in the base 314. The tabs 316c are then welded as at 317 (FIG. 24) or otherwise bonded to the base 314 to provide a rigid support.

Although the covers 308 are illustrated herein as being hollow or air filled, they may also be filled with a material such as, for example, a low density foam or other suitable non-conductive material for added support and rigidity if required for a more robust application.

The skin 318 may be any suitable non-conductive material, such as, for example, an FR-4 material such as is commonly used for printed circuit boards.

The cover 308 improves clean-up and color change procedures within a spray booth by virtue of the fact that even though overspray powder particles may initially alight on the surface of the skin 318, any electrostatic charge associated with the powder will continue to pass through the skin and be collected on the conductive inner surface 312. The inner surface 312, like the rails 302 and the base 314 are grounded. Therefore, the inner surface 312 acts as a ground path and disassociates the powder particles from electrostatic charge associated with the powder overspray. The powder particles therefore are not influenced by any surface charge on the cover 308 and will readily fall off to be collected by the extraction duct 300 (as described herein above). The grounded conductive inner surface of the base 314 also serves to ground or dissipate tribocharging effects of the high velocity air/powder stream flowing through the duct 300.

Conductive Extraction Duct for Overspray Powder

Figure 25:
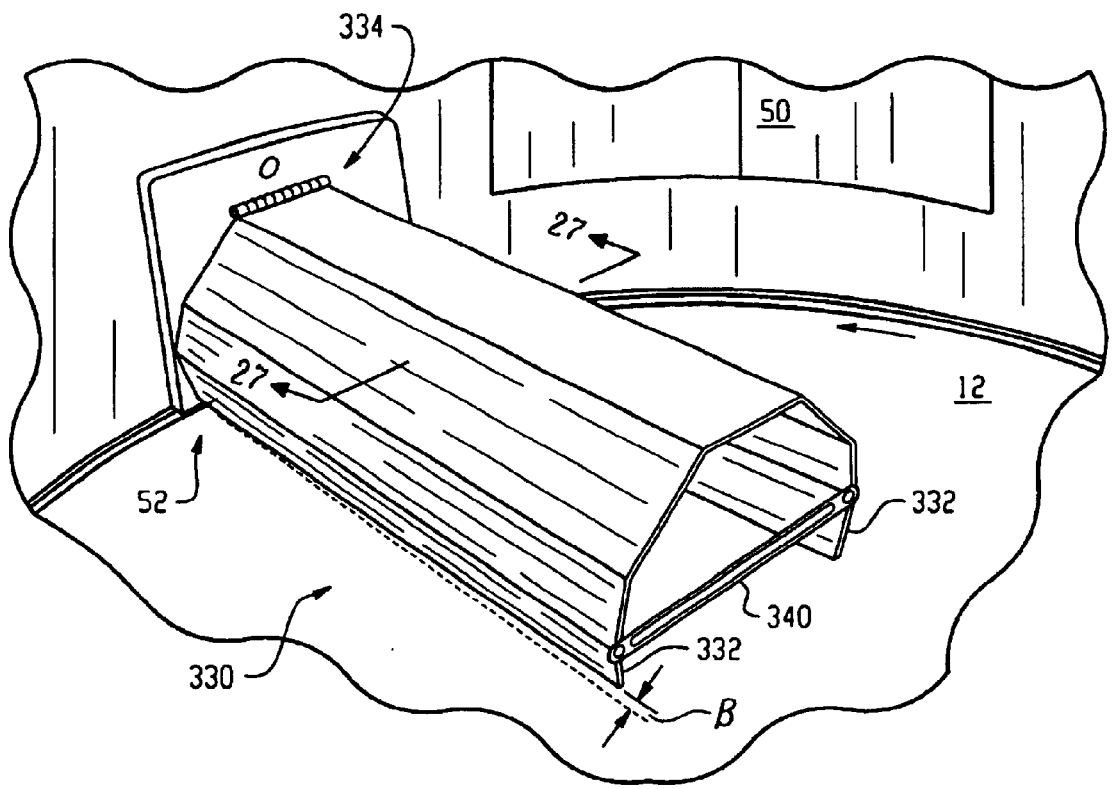
FIGS. 25–27 illustrate an embodiment of a half-length powder extraction duct.
Figure 26:
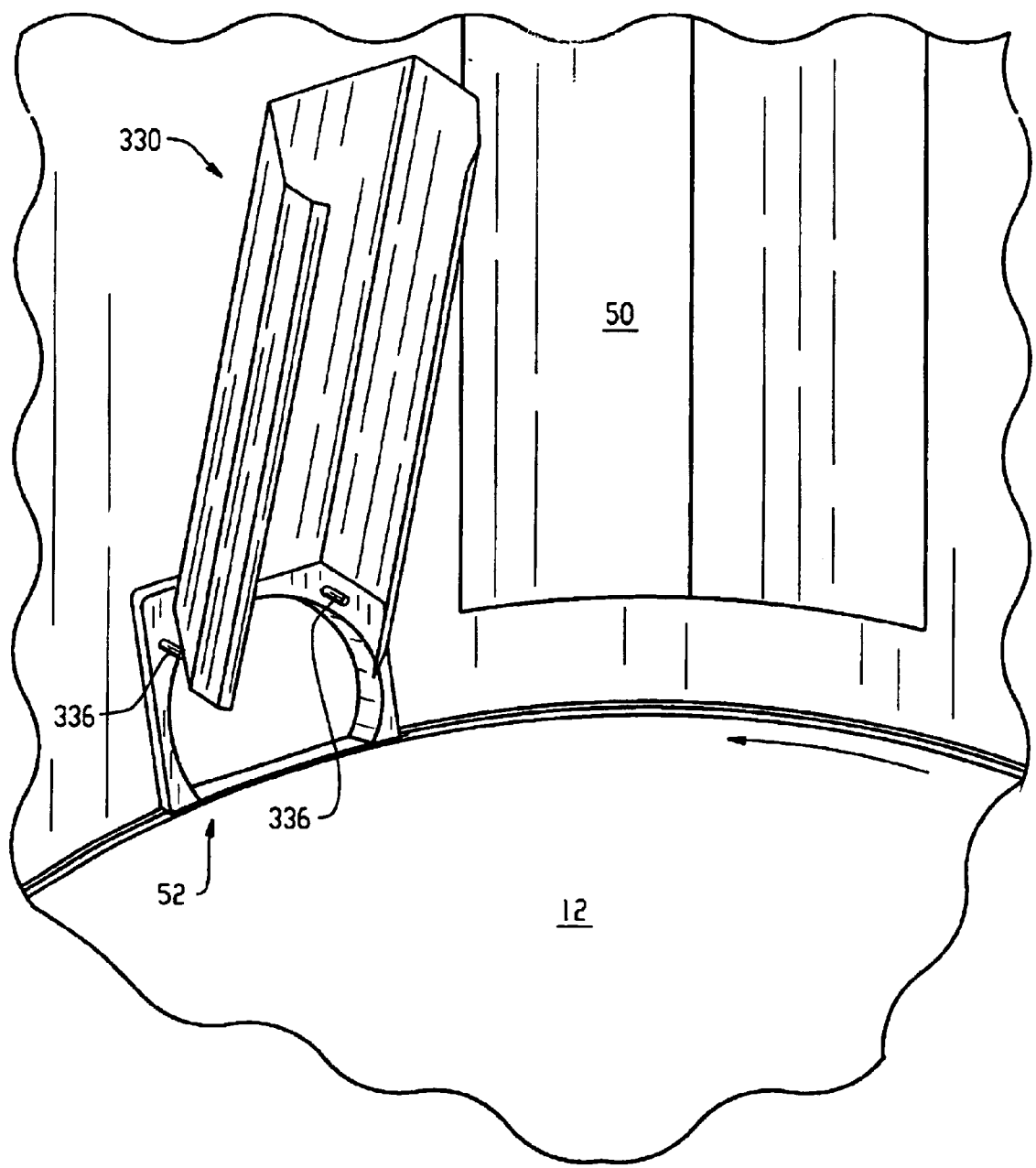

With reference to FIG. 25–26, in another embodiment of the invention, we have discovered that the extraction duct 40 described hereinabove does not need to extend completely across the spray booth floor 16. Rather, a half-duct may be used just as effectively as a full length duct. By reducing the length of the duct in half a number of significant advantages are gained. The half-duct is substantially less expensive due to the savings in material costs. There also does not need to be hinged doors, but rather the half-duct can simply be hinged or otherwise attached to the cyclone inlet duct 52. No support mechanism is required on the free end of the half-duct as the structure is supported in a cantilever fashion above the floor 12. With half of the floor 12 now unimpeded by a duct structure, it is considerably easier for an operator to work within the booth 10 interior. Moreover, with only half of the surface area to clean, the half-duct can be conductive and made of inexpensive metal rather than composite materials. The smaller surface area is easier to clean compared to a full sized duct and the powder can readily be drawn into the extraction duct.

Figure 27:
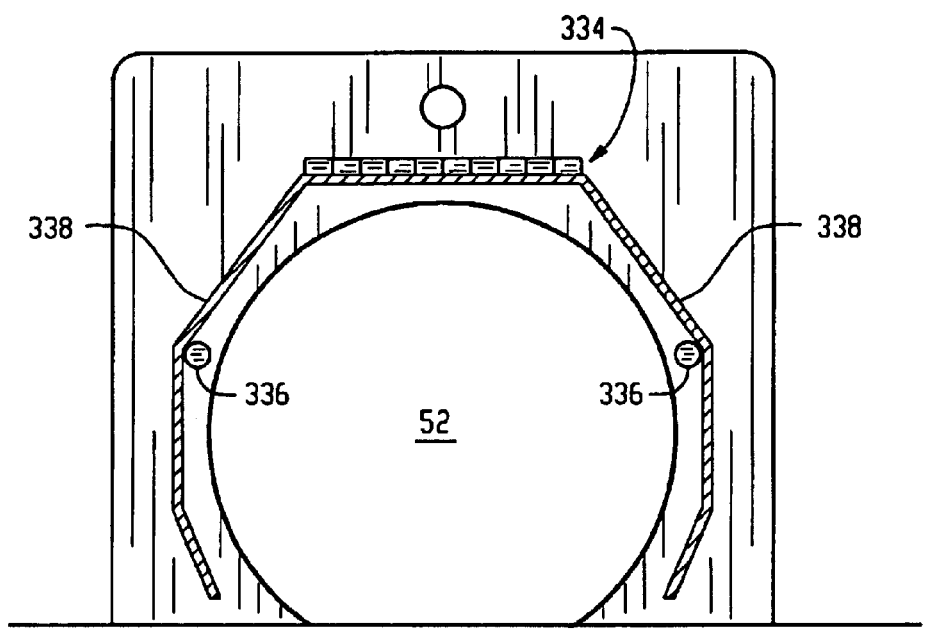

With reference then to FIGS. 25–27, in accordance with this aspect of the invention a powder extraction duct 330 is provided that may be of the same general configuration as the duct 40 described herein including a skirt 332. As with the full length duct 40 described hereinbefore, the duct 330 is supported in such a manner and shaped so as to incline the duct 330 above the floor 12 at an angle β with the narrower portion near the cyclone inlet 52. A hinge 334 or other suitable support is provided to allow an operator to swing the duct 330 up as illustrated in FIG. 26. Alignment pins 336 may be provided to support the duct walls 338 and to assure that the duct 330 is aligned with the cyclone inlet 52 when the duct is in the down position illustrated in FIG. 25. A crossbar or brace may also function as a handle 340 for lifting the duct 330. A lip seal (not shown) may be provided to provide an air seal between the hinged end of the duct 330 and the cyclone inlet 52 structure. The free end of the duct can be completely open and powder will still be swept up by the extraction duct 330 in a manner substantially the same as the full length duct 40 described hereinabove.

With only one half of the rotating floor 12 being swept by the half-duct 330, the same powder collection rate compared to using a full length duct can be achieved by simply doubling the rotation speed of the floor 12.

Containment Air Flow for Conveyor Slot

Figure 28:
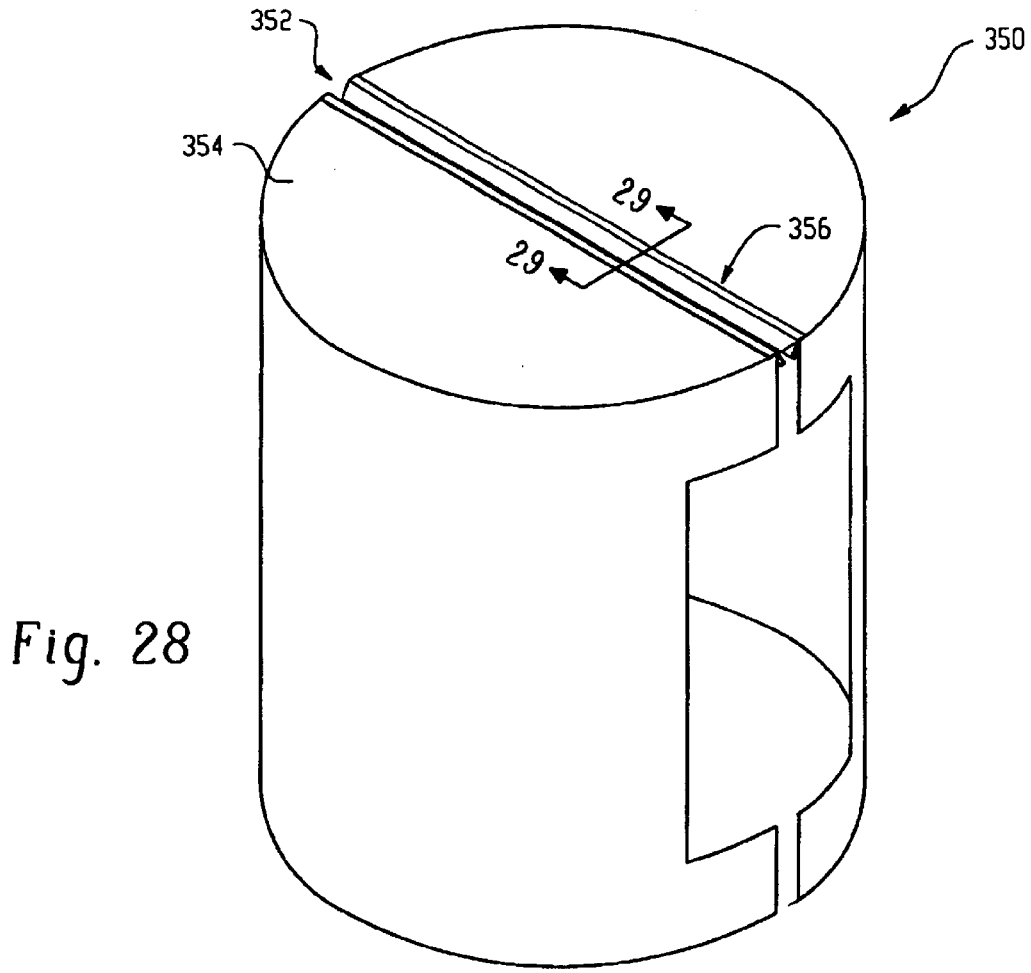
FIG. 28 is a simplified illustration of a spray booth incorporating an air manifold for the conveyor slot.

With reference to FIG. 28, in this simplified illustration of a powder spray booth 350, in some applications and booth configurations the conveyor slot 352 in the roof 354 presents an opening through which powder overspray may escape. In the past, conveyor shrouds or other cover style arrangements have been used to attempt to keep the powder overspray from escaping through the slot 352. In accordance with one aspect of the present invention, a containment air flow is provided at the conveyor slot 352 to produce an inwardly directed air flow to prevent powder from escaping through the conveyor slot. Preferably although not necessarily the conveyor slot containment air flow extends across the entire conveyor slot opening. In one embodiment, a compressed air manifold 356 is positioned along the conveyor slot 352 to direct an inward flow of air through the slot. This inward air flow is in effect an air curtain that helps to contain overspray powder within the spray booth by producing a positive pressure differential outside the conveyor slot and an air stream directed into the spray booth.

Figure 29:
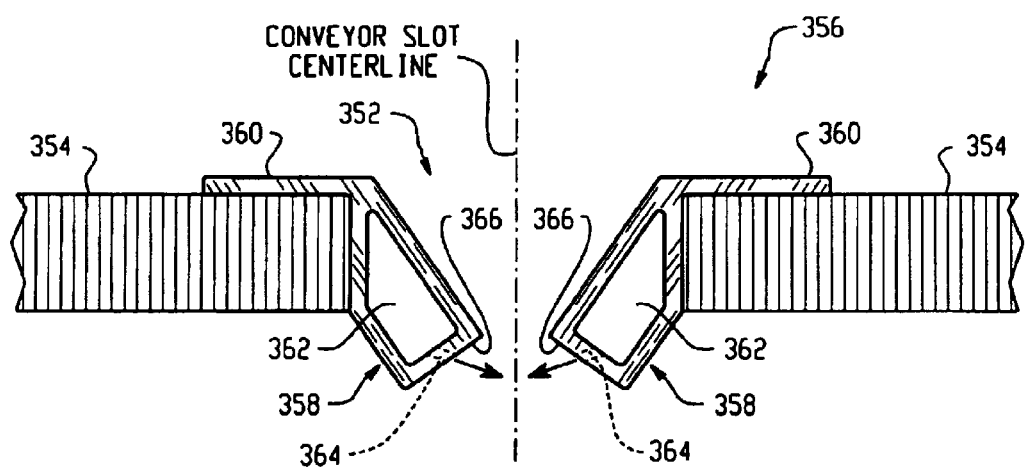
FIG. 29 is a cross-section view taken along line 29—29 of FIG. 28.

With reference to FIG. 29, the manifold 356 realized in the form of a pair of air channels 358, each having an integral mounting flange 360 extending there from. The flanges 360 are each attached to an upper surface of the roof 354 by any suitable method such as bonding. The flanges 360 need not be integrally formed with the channels 358 as other techniques may be used to attach or bond the channels 358 to the spray booth. Although two channels are illustrated in the exemplary embodiment, in some applications a single channel may be used. The channels 358 are spaced apart about the centerline CL of the conveyor slot 352 so as to leave sufficient room for the conveyor elements that must pass through the booth interior.

Each air channel 358 is a generally hollow structure to form an air passageway 362 therethrough. The channels 358 extend preferably across the entire length of the conveyor slot 352. Each channel 358 further includes a series of air jets or bores 364 through a wall 366 of the channel 358. These air jets 364 provide a flow of pressurized air downward and into the spray booth as indicated by the directional arrows in FIG. 29. These air jets 364 are provided along the entire length of each channel 358 so as to produce an air curtain effect along the entire conveyor slot 352. The channels 358 may each be made of any suitable material. In one example, the channels are made of a pultrusion of fiberglass and polyester resin material which is easy to drill for the air jets 364 and easy to bond to the composite booth structure described hereinabove. Other techniques may be used to form the manifold 356 including extrusions, molding or machining. Additionally, rather than discrete air jets, a continuous slot or series of slots may be used to direct air from inside the passageway towards the booth interior because the channels 358 are not load bearing structures.

The channels 358 are coupled to a source of pressurized air (not shown) such as by an appropriate air fitting mounted on respective closed ends of the channels 358.

Figure 31:
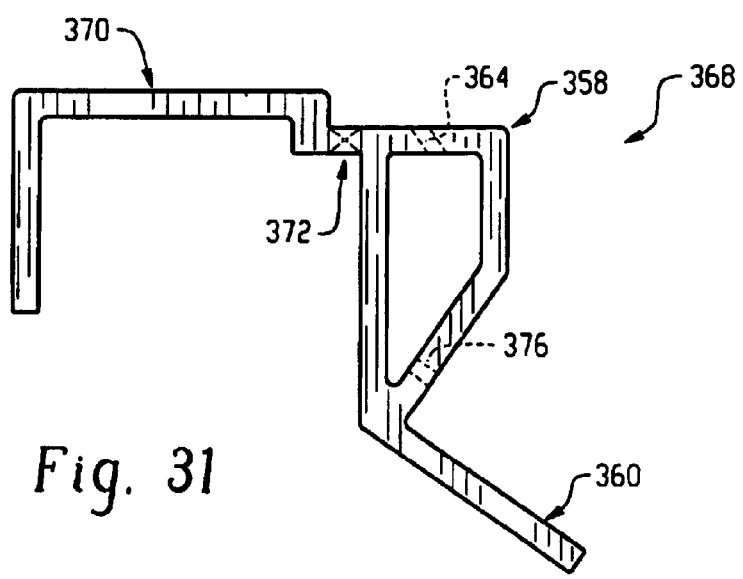
Figure 32:
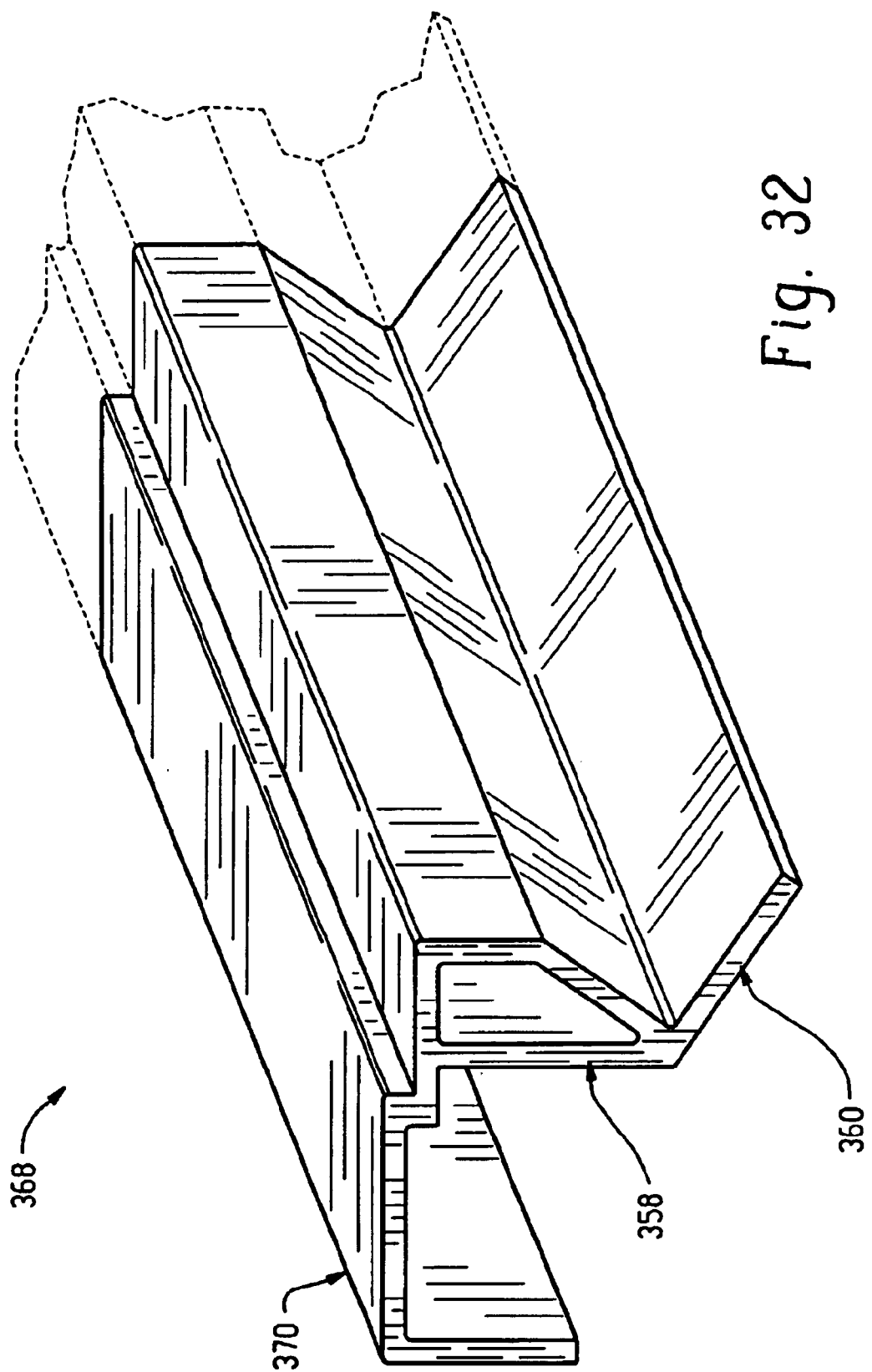

The use of a pultrusion as set forth herein is particularly advantageous for making a multiuse structure as illustrated in FIGS. 31 and 32. In one embodiment, a pultrusion 368 is formed that includes an air channel 358 and the associated flange 360. The air jets 364 are illustrated in FIG. 31 for reference, however, in practice the jets 364 are not formed as part of the pultrusion process but rather are drilled afterwards.

The pultrusion 368 further includes an L-shaped support 370. The L-shaped support is joined to the channel 358 portion by a bridge piece 372. When it is desired to use the channel portion 358 separately from the support portion 370, the two portions are separated by removing the bridge piece 372 such as by cutting.

Figure 30:
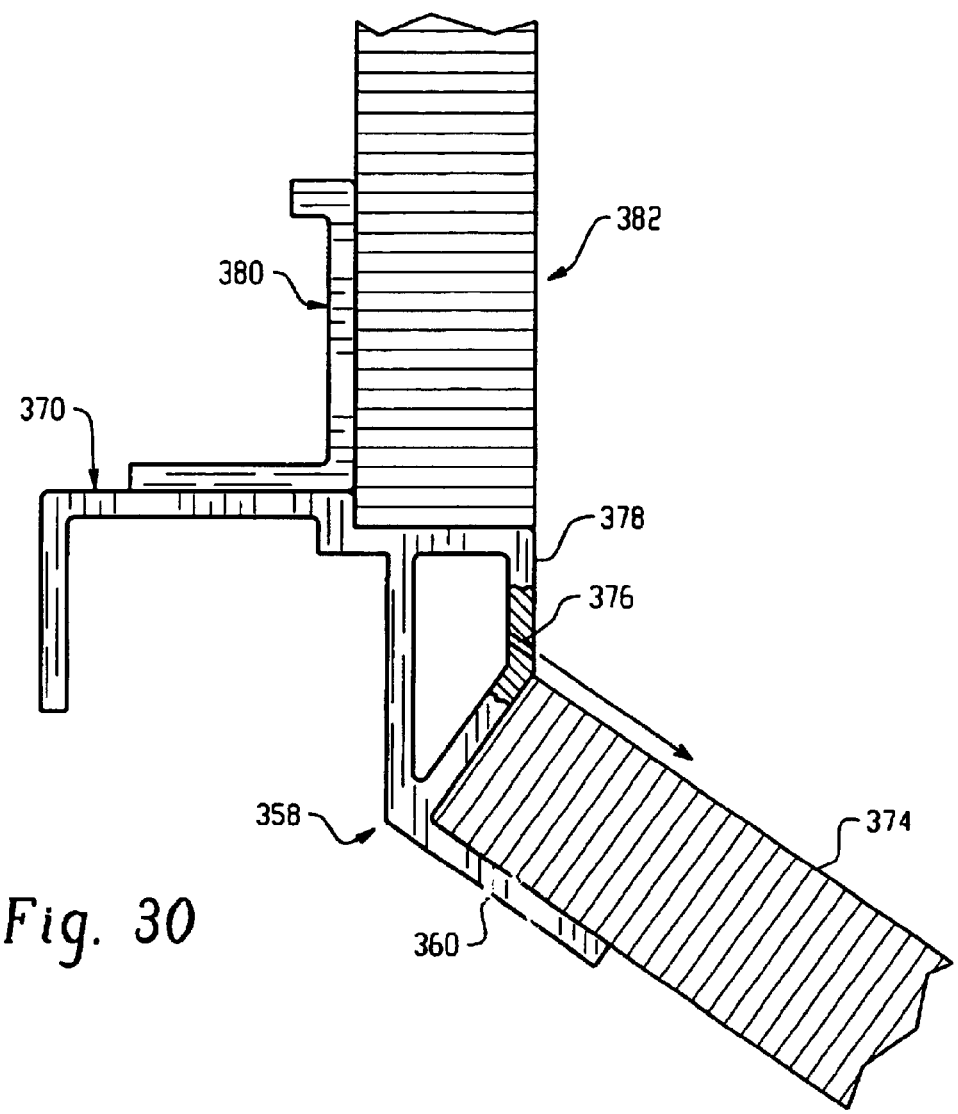
FIGS. 30–32 illustrate a pultruded multiuse structure in accordance with the invention.

The channel portion 358 is designed for a multiuse feature, as illustrated in FIG. 30. FIG. 30 illustrates a part of a spray booth that is of the type having a sloped floor 374. Such a booth is described in copending PCT International patent application no. PCT/GB01/01116 filed on Mar. 14, 2001 for IMPROVEMENTS IN AND RELATING TO POWDER COATING SYSTEMS, published in English as publication no. WO 01/7447A1 on Oct. 11, 2001, the entire disclosure of which is fully incorporated herein by reference. In this additional use of the channel 358, the flange 360 is used to attach the channel 358 to the underside of the floor 374. Air jets 376 are formed in a wall 378 of the channel 358. The air jets 376 are provided along the entire length of the channel 358. The air jets 376 are formed so as to direct a laminar type flow of pressurized air across the spray booth floor 374 (as indicated by the directional arrows in FIG. 30) to blow powder from the floor.

The L-shaped support 370 may be secured to a structural support of the spray booth (not shown). A separated L-shaped portion 380 may also be used as a wall brace for a wall 382 of the spray booth. The brace 380 is simply the remaining piece formed when the channel portion 358 is separated at the bridge 372. For example, a channel 358 may be separated from the pultrusion 368 for use as part of the air curtain manifold 356 described herein with reference to FIG. 28. The remaining L-shaped portion 380 is then available for use in a different booth structure as a wall support. The air jets 376/364 are formed after a particular channel application is selected (thus the air jets 364/376 illustrated in FIG. 31 are not part of the pultrusion but formed afterwards).

It is intended that invention not be limited to the particular embodiments and alternative embodiments disclosed as the best mode or preferred mode contemplated for carrying out the invention, but that the invention will include all embodiments falling within the scope of the appended claims.

Having thus described the invention, we claim:

1. A powder coating booth comprising:

a booth canopy including a ceiling and walls constructed from electrically non-conductive materials; said ceiling including a conveyor slot that extends along the ceiling said walls having gun slots;

a plurality of electrostatic powder coating guns extending through said gun slots in said walls to spray electrically charted powder coating materials onto electrically grounded work pieces conveyed through the booth by an electrically grounded conveyor which extends along said conveyor slot;

a pair of electrically nonconductive, hollow air manifold members, each having an internal channel connectable to a source of pressurized air, a plurality of apertures formed in each said air manifold member and in fluid communication with a respective said internal channel to allow jets of compressed air to issue from said channels through said apertures, said air jets being directed away from said conveyor slot to blow electrically charged oversprayed powder coating material away from said conveyor slot so that said electrically charged oversprayed powder coating material is not attracted towards said electrically grounded conveyor, each of said air manifold members further having a flange to allow said manifold members to be attached to said ceiling by said flange.

2. The booth of claim 1 wherein said flanges are formed as integral parts of said air manifold members.

3. The booth of claim 1 wherein each said air manifold is a pultruded body.

4. The booth of claim 3 wherein said pultrusion comprises an electrically non-conductive material.

5. The booth of claim 4 wherein said material comprises fiberglass and a polyester resin.

6. The booth of claim 2 wherein said manifold is bonded to said ceiling by said flanges.

* * * * *

UNITED STATES PATENT AND TRADEMARK OFFICE
CERTIFICATE OF CORRECTION

PATENT NO. : 6,866,717 B2
DATED : March 15, 2005
INVENTOR(S) : Jeffrey R. Shutic et al.

It is certified that error appears in the above-identified patent and that said Letters Patent is hereby corrected as shown below:

Column 3,
Line 22, delete the comma ",".

Column 22,
Line 62, delete the word "charted" and insert -- charged --.

Signed and Sealed this

Seventh Day of June, 2005

JON W. DUDAS
*Director of the United States Patent and Trademark Office*